United States Patent
Kurahashi

(10) Patent No.: US 12,339,561 B2
(45) Date of Patent: Jun. 24, 2025

(54) MACH-ZEHNDER TYPE OPTICAL MODULATOR, OPTICAL TRANSCEIVER, AND DISPERSION COMPENSATION METHOD

(71) Applicant: NEC Corporation, Tokyo (JP)

(72) Inventor: Ryo Kurahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 184 days.

(21) Appl. No.: 18/123,445

(22) Filed: Mar. 20, 2023

(65) Prior Publication Data

US 2023/0375893 A1     Nov. 23, 2023

(30) Foreign Application Priority Data

May 23, 2022   (JP) ................. 2022-083664

(51) Int. Cl.
| | | |
|---|---|---|
| H04B 10/00 | (2013.01) | |
| G02F 1/21 | (2006.01) | |
| G02F 1/225 | (2006.01) | |
| H04B 10/516 | (2013.01) | |
| H04J 14/00 | (2006.01) | |

(52) U.S. Cl.
CPC .......... G02F 1/2252 (2013.01); G02F 1/212 (2021.01); H04B 10/516 (2013.01)

(58) Field of Classification Search
CPC .... H04B 10/50; H04B 10/503; H04B 10/505; H04B 10/5053; G02F 1/212; G02F 2203/25; G02F 2203/255
See application file for complete search history.

(56) References Cited

U.S. PATENT DOCUMENTS

| | | | | |
|---|---|---|---|---|
| 5,524,076 A | * | 6/1996 | Rolland | ................. B82Y 20/00 |
| | | | | 385/2 |
| 6,204,951 B1 | * | 3/2001 | Coward | .................. G02F 1/225 |
| | | | | 398/9 |
| 2011/0116792 A1 | * | 5/2011 | Blumenthal | ............ H04L 7/027 |
| | | | | 398/43 |

FOREIGN PATENT DOCUMENTS

| JP | 2010-206768 A | 9/2010 |
|---|---|---|
| JP | 2015-094812 A | 5/2015 |

(Continued)

OTHER PUBLICATIONS

F. Koyama and K. Iga, "Frequency Chirping in External Modulators", Jan. 1988, Journal of Lightwave Technology, vol. 6, No. 1.

(Continued)

*Primary Examiner* — Daniel G Dobson

(57) ABSTRACT

A first directional coupler branching input light into a cross-port path having a branching ratio η and a bar-port path having a branching ratio 1-η. A first arm propagating light from the cross-port path of the first directional coupler; a second arm propagating light from the bar-port path of the first directional coupler. A second directional coupler outputting output light acquired by combining the light being input from the first arm and the light being input from the second arm at the cross-port branching ratio γ and the bar-port branching ratio 1-γ. A phase modulation unit providing a phase difference between the light propagating through the first arm and the light propagating through the second arm. η and 1-η, and γ and 1-γ are determined such that an α parameter being a chirp parameter is a negative value.

14 Claims, 20 Drawing Sheets

(56) References Cited

FOREIGN PATENT DOCUMENTS

JP      2017-003813 A    1/2017
WO      2006/100719 A1   9/2006

OTHER PUBLICATIONS

T. Kawanishi, K. Kogo, S. Oikawa, M. Izutsu, "Direct measurement of chirp parameters of high-speed Mach-Zehnder-type optical modulators", Aug. 2001, Optics Communications, vol. 195.

H. Kim and A. Gnauck, "Chirp Characteristics of Dual-Drive Mach-Zehnder Modulator With a Finite DC Extinction Ratio", Mar. 2002. IEEE Photonics Technology Letters, vol. 14, No. 3.

Y. Yamaguchi, A. Kanno, T. Kawanishi, M. Izutsu and H. Nakajima, "Precise Optical Modulation Using Extinction-Ratio and Chirp Tunable Single-Drive Mach-Zehnder Modulator", Nov. 2017, Journal of Lightwave Technology, vol. 35, No. 21.

Y. Yamaguchi, "Advanced Optical Modulator Based on Integrated Mach-Zehnder Interferometer", 2017. Doctral Dissertation, Waseda University.

JT-G652 "Characteristics of a single-mode optical fibre and cable", The Telecommunication Technology Committee, Edition 1.1, May 24, 2018.

* cited by examiner

MACH-ZEHNDER TYPE OPTICAL MODULATOR, OPTICAL TRANSCEIVER, AND DISPERSION COMPENSATION METHOD

INCORPORATION BY REFERENCE

This application is based upon and claims the benefit of priority from Japanese patent application No. 2022-83664, filed on May 23, 2022, the disclosure of which is incorporated herein in its entirety by reference.

TECHNICAL FIELD

The present disclosure relates to a Mach-Zehnder type optical modulator, an optical transceiver, and a dispersion compensation method.

BACKGROUND ART

In order to achieve optical communication with a constant bit error rate (BER) or lower, light receiving power equal to or higher than a certain value is required, and this is referred to as minimum reception sensitivity. In a case where an optical signal is transmitted through a transmission medium such as an optical fiber, when optical power gradually decreases according to a transmission distance, a noise component having a statistical fluctuation with respect to a main signal becomes relatively large, and the BER increases.

Meanwhile, when attention is paid to a pulse shape on a time axis at a time of modulation, the pulse spreads on the time axis by propagating through the optical fiber being the transmission medium. This is due to characteristics of an optical fiber called wavelength dispersion, which occurs since a propagation speed of light differs depending on a wavelength. When the pulse spreads, the noise component increases and the BER increases, and therefore, the minimum reception sensitivity deteriorates. Further, the longer the transmission distance is, the greater an influence of dispersion is. Therefore, in order to satisfy the minimum reception sensitivity, the wavelength dispersion, a modulation rate, and the transmission distance, which are determined by standards, system requirements, and the like, are influenced.

For reducing the influence of wavelength dispersion, a dispersion compensation fiber is applied, a communication standard is applied at a zero dispersion wavelength of the optical fiber (in a case of a general-purpose single-mode fiber, the wavelength is around 1.3 μm), and introduction of waveform compensation by a digital coherent technology, pre-chirp of a transmission waveform, and the like are carried out.

A small form-factor pluggable (SFP) optical transceiver to be used in a mobile fronthaul and the like is an optical module that interconverts an optical signal and an electric signal, and expansion of communication capacity and enhancement of long-distance transmission are required. Accordingly, in the SFP optical transceiver, a wide variety of electric circuits and optical circuits, for example, Mach-Zehnder type optical modulators (International Patent Publication No. WO 2006/100719, Japanese Unexamined Patent Application Publication No. 2017-3813, Japanese Unexamined Patent Application Publication No. 2010-206768, and Japanese Unexamined Patent Application Publication No. 2015-94812) for modulating an optical signal are integrated and mounted inside a small package with high density. In such a small optical module, there are restrictions such as not only a physical size but also power consumption, heat generation associated therewith, and cost reduction. In addition, while expansion of transmission capacity is required due to advancement of mobile communication technologies such as 5G and 6G, application of wavelength division multiplex (WDM) transmission technology is considered in order to effectively utilize existing optical fiber networks.

SUMMARY

When an optical signal is transmitted through a transmission path in a network to which the above-described technology is applied, it is required to compensate for wavelength dispersion caused by transmission. However, since an SFP optical transceiver is connected to a general-purpose single-mode fiber (SMF), zero-dispersion wavelengths cannot be used in a wavelength band of 1.5 μm, where WDM technology cultivated in a backbone network can be used. In addition, the dispersion compensation fiber needs to be individually adjusted in length according to the transmission distance, and it is difficult to use the dispersion compensation fiber in a mobile network having strong cost constraint. Moreover, since the digital coherent technology requires a digital signal processor (DSP) being expensive and large in power consumption, it is still difficult to use the digital coherent technology in an SFP optical transceiver for mobile fronthaul.

The above-described pre-chirp of a transmitted signal is usually achieved by a high-frequency (RF: Radio Frequency) signal applied to a modulator, but a pre-chirp function is imparted to a modulator driver, and therefore, a disadvantage arises from a viewpoint of power consumption and cost.

Meanwhile, the SFP optical transceiver is inexpensive and can be mass-produced, has good compatibility with silicon (Si) photonics technology having features such as low power consumption and small size, and can integrate an optical circuit portion for transmission into a Si photonics chip. In this case, a Mach-Zehnder type optical modulator having good characteristics such as high-speed modulation capability, low loss, and high extinction ratio may be employed as the optical modulator. Therefore, it is conceivable to perform pre-chirping for compensating for wavelength dispersion on an optical signal to be transmitted, by the Mach-Zehnder type optical modulator. However, the Mach-Zehnder type optical modulator generally does not produce frequency chirp. Strictly speaking, although the frequency chirp is not zero, it is a small value. Therefore, there is a need to establish a method of performing pre-chirping by a Mach-Zehnder type optical modulator in order to compensate for wavelength dispersion with respect to an optical signal to be transmitted.

The present disclosure has been made in view of the above-described circumstance, and an example object thereof is to provide a Mach-Zehnder type optical modulator applicable to an optical transceiver, an optical transceiver, and a wavelength dispersion compensation method that are capable of achieving long-distance transmission with suitable reception sensitivity.

In a first example aspect of the present disclosure, a Mach-Zehnder type optical modulator includes: a first directional coupler configured to branch input light into a cross-port path having a cross-port branching ratio $\eta$ and a bar-port path having a bar-port branching ratio $1-\eta$—; a first arm configured to propagate light from the cross-port path of the first directional coupler; a second arm configured to propagate light from the bar-port path of the first directional coupler; a second directional coupler with two inputs and two outputs being configured to input light from the first arm to one input thereof and light from the second arm to another input thereof, and have a cross-port branching ratio of γ and a bar-port branching ratio of 1-γ; and a phase modulation unit configured to provide a phase difference between the light propagating through the first arm and the light propagating through the second arm, wherein the cross-port branching ratio η and the bar-port branching ratio 1-η, and the cross-port branching ratio γ and the bar-port branching ratio 1-γ are determined in such a way that an α parameter being a chirp parameter is a negative value.

In a second example aspect of the present disclosure, an optical transceiver includes: a transmitter configured to transmit an optical signal having a light source and a Mach-Zehnder type optical modulator configured to modulate light from the light source; a receiver configured to receive an optical signal to be input; and a control unit configured to control the transmitter and the receiver, wherein the Mach-Zehnder type optical modulator includes: a first directional coupler configured to branch light being input from the light source into a cross-port path having a cross-port branching ratio η and a bar-port path having a bar-port branching ratio 1-η; a first arm configured to propagate light from the cross-port path of the first directional coupler; a second arm configured to propagate light from the bar-port path of the first directional coupler; a second directional coupler with two inputs and two outputs being configured to input light from the first arm to one input thereof and light from the second arm to another input thereof, and have a cross-port branching ratio of γ and a bar-port branching ratio of 1-γ; and a phase modulation unit configured to provide a phase difference between the light propagating through the first arm and the light propagating through the second arm, wherein the cross-port branching ratio η and the bar-port branching ratio 1-η, and the cross-port branching ratio γ and the bar-port branching ratio 1-γ are determined in such a way that an α parameter being a chirp parameter is a negative value.

In a third example aspect of the present disclosure, a dispersion compensation method includes: branching input light into a cross-port path having a cross-port branching ratio of η and a bar-port path having a bar-port branching ratio 1-η by a first directional coupler; inputting light from the cross-port path of the first directional coupler to a first arm; inputting light from the bar-port path of the first directional coupler to a second arm; inputting light from the first arm to one input of a second directional coupler with two inputs and two outputs, and inputting light from the second arm to another input thereof, the second directional coupler having a cross-port branching ratio of γ and a bar-port branching ratio of 1-γ; providing a phase difference between the light propagating through the first arm and the light propagating through the second arm; and determining the cross-port branching ratio η and the bar-port branching ratio 1-η, and the cross-port branching ratio γ and the bar-port branching ratio 1-γ in such a way that an α parameter being a chirp parameter is a negative value.

BRIEF DESCRIPTION OF DRAWINGS

The above and other aspects, features, and advantages of the present disclosure will become more apparent from the following description of certain example embodiments when taken in conjunction with the accompanying drawings, in which.

EXAMPLE EMBODIMENT

Figure 1:
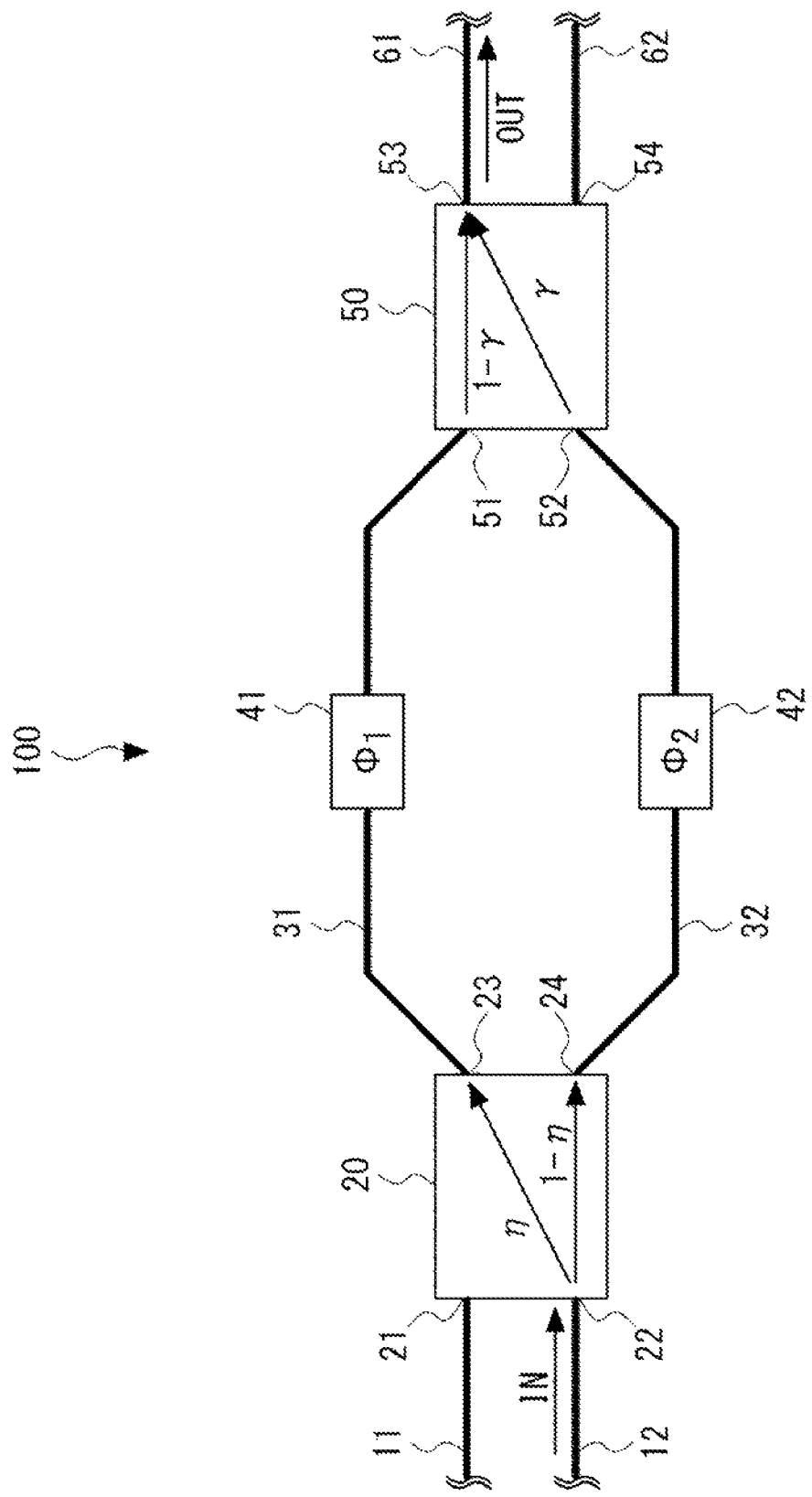
FIG. 1 is a diagram schematically illustrating a configuration of a Mach-Zehnder type optical modulator according to a first example embodiment.

Hereinafter, example embodiments of the present disclosure will be described with reference to the drawings. In the drawings, the same elements are denoted by the same reference numerals, and redundant description is omitted as necessary.

First Example Embodiment

A Mach-Zehnder type optical modulator according to a first example embodiment will be described. The Mach-Zehnder type optical modulator according to the first example embodiment is configured such that a branching ratio of light of an input-side branching unit and a branching ratio of light of an output-side branching unit are suitably designed, thereby achieving both the impartation of positive dispersion tolerance and a desired extinction ratio. Hereinafter, the configuration and mechanism thereof will be described.

First, a configuration of a Mach-Zehnder type optical modulator 100 according to the first example embodiment will be described. FIG. 1 schematically illustrates a configuration of the Mach-Zehnder type optical modulator 100 according to the first example embodiment. The Mach-Zehnder type optical modulator 100 includes input waveguides 11 and 12, an input-side branching unit 20, arms 31 and 32, phase modulation units 41 and 42, an output-side branching unit 50, and output waveguides 61 and 62. Note that an input-side branching unit is also referred to as an input-side splitter or an input-side multiplexer/demultiplexer and an output-side branching unit is also referred to as an output-side splitter or an output-side multiplexer/demultiplexer.

The input-side branching unit 20 is a two-input two-output optical branching unit having two input ports 21 and 22 and two output ports 23 and 24. In this configuration, the input-side branching unit 20 is configured as a directional coupler, and is also referred to as a first directional coupler. The input waveguides 11 and 12 are connected to the input ports 21 and 22, respectively. Herein, it is assumed that an optical signal is input from the input waveguide 12 to the input port 22. One end of the arm 31 is output to the output port 23 serving as a bar port with respect to the input port 21 connected to the input waveguide 11. One end of the arm 32 is output to the output port 24 serving as a bar port with respect to the input port 22 connected to the input waveguide 12.

The arms 31 and 32 (also referred to as first and second arms, respectively) are provided with the phase modulation units 41 and 42 (also simply referred to as a phase modulation unit or a phase modulator) capable of adjusting a phase of an optical signal passing therethrough, respectively.

The output-side branching unit 50 is a two-input two-output optical branching unit having two input ports 51 and 52 and two output ports 53 and 54. In this configuration, the output-side branching unit 50 is configured as a directional coupler, and is also referred to as a second directional coupler. The output waveguides 61 and 62 are connected to the output ports 53 and 54, respectively. Another end of the arm 31 is connected to the input port 51 serving as a bar port with respect to the output port 53 to which the output waveguide 61 is connected. Another end of the arm 32 is connected to the input port 52 serving as a bar port with respect to the output port 54 to which the output waveguide 62 is connected.

In the Mach-Zehnder type optical modulator 100, a modulated optical signal after modulation is output from the output port 53 of the output-side branching unit 50, which serves as a cross port, with respect to the input port 22 of the input-side branching unit 20 to which the optical signal is input.

Figure 2:
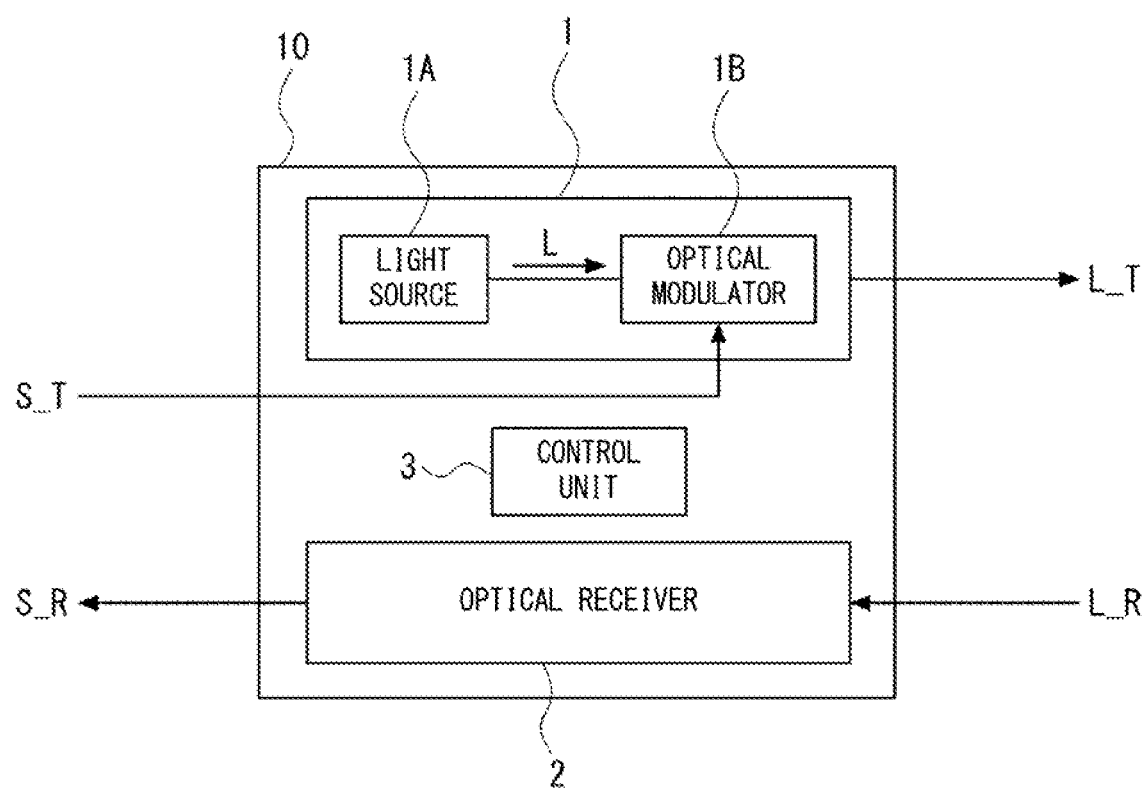
FIG. 2 is a diagram schematically illustrating a configuration of an optical transceiver in which the Mach-Zehnder type optical modulator according to the first example embodiment is incorporated.

Next, an application example of the Mach-Zehnder type optical modulator 100 will be described. FIG. 2 schematically illustrates a configuration of an optical transceiver 10 in which the Mach-Zehnder type optical modulator 100 according to the first example embodiment is incorporated. As illustrated in FIG. 2, the optical transceiver 10 is configured as a pluggable optical module, such as an SFP optical transceiver.

The optical transceiver 10 includes an optical transmitter 1, an optical receiver 2, and a control unit 3. The control unit is also referred to as a controller. The control unit 3 is configured to be able to control operations of the optical transmitter 1 and the optical receiver 2. The optical transmitter 1 outputs an optical signal L_T modulated based on an electrical signal S_T being input from an external optical communication device or the like. The optical receiver 2 receives an optical signal L_R to be input to the optical transceiver 10 via an optical cable or the like, and outputs an electrical signal S_R acquired by decoding the optical signal to the optical communication device.

The optical transmitter 1 includes a light source 1A and an optical modulator 1B. The light source 1A is configured as, for example, a tunable laser module capable of outputting a laser beam having a wavelength in a certain range. The optical modulator 1B outputs an optical signal L_T acquired by modulating a laser beam L to be input from the light source 1A, based on the electrical signal S_T.

The Mach-Zehnder type optical modulator 100 according to the present example embodiment is used as the optical modulator 1B, and a signal based on the electric signal S_T or an signal S_T is applied to the phase modulation units 41 and 42, whereby a laser beam IN (associated to the laser beam L in FIG. 2) being input to the input port 22 is modulated, and an optical signal OUT after modulation (associated to the optical signal L_T in FIG. 2) is output from the output port 53.

In the present example embodiment, in the above-described configuration, an optical signal to which a pre-chirp is imparted in advance is transmitted in order to impart a tolerance (hereinafter, referred to as a positive dispersion tolerance) against wavelength dispersion, to an optical signal transmitted through a transmission path. Hereinafter, the impartation of the positive dispersion tolerance in the Mach-Zehnder type optical modulator 100 will be described. In the present example embodiment, transmission characteristics of the Mach-Zehnder type optical modulator 100, specifically, so-called chirp parameters are adjusted, thereby enabling to achieve a desired positive dispersion tolerance.

The chirp parameter is a value also referred to as an $\alpha$ parameter, and when the value is hereinafter written as an $\alpha$ parameter, it refers to a chirp parameter.

[Relationship Between $\alpha$ Parameter and Positive Dispersion Tolerance]

First, a relationship between an $\alpha$ parameter and a positive dispersion tolerance in the Mach-Zehnder type optical modulator 100 will be described. The $\alpha$ parameter represents a phase modulation effect associated with intensity modulation, and is described as Equation [1] (F. Koyama and K. Iga, "Frequency Chirping in External Modulators", January 1988, J. Light. Technol., vol. 6, no. 1, pp. 87-93.), where a temporal variation in a phase $\Phi$ of an electric field is divided by a temporal variation in an electric field E. P in Equation [1] is a value acquired by squaring the electric field E, and indicates power of the electric field E.

[Mathematical 1]

$$\alpha = \frac{\frac{d\Phi}{dt}}{\frac{1}{E}\frac{dE}{dt}} = \frac{2P\frac{d\Phi}{dt}}{\frac{dP}{dt}} \quad [1]$$

Figure 3:
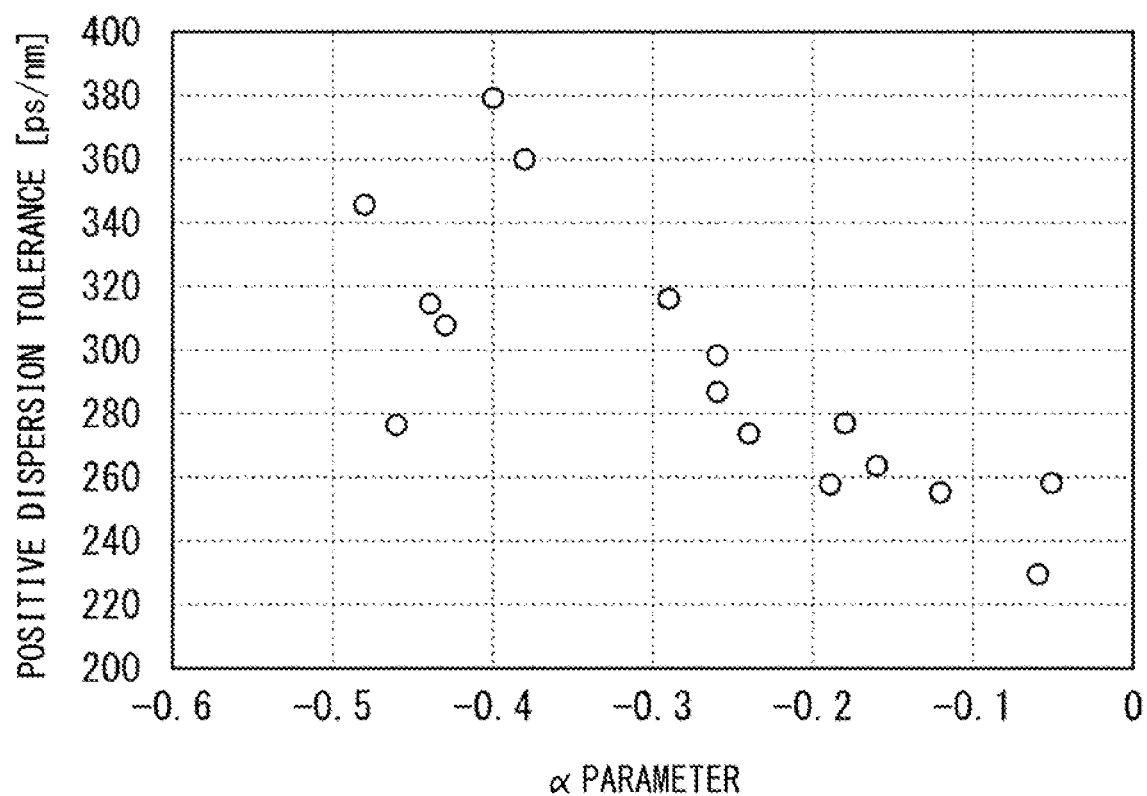
FIG. 3 is a diagram illustrating an example of actual measurement of a relationship between an α parameter and positive dispersion tolerance at a wavelength of 1550 nm.

FIG. 3 illustrates an actual measurement example of a relationship between an $\alpha$ parameter and a positive dispersion tolerance at a wavelength of 1550 nm. As illustrated in FIG. 3, in order to acquire the positive dispersion tolerance, it can be seen that the $\alpha$ parameter can be a negative value and an absolute value thereof can be increased. Note that although a sign of the wavelength dispersion of SMF is different depending on a wavelength to be used, in order to acquire a positive dispersion tolerance at a wavelength of 1550 nm, it can be seen that the value of the $\alpha$ parameter can be made negative, from FIG. 3.

[Relationship Between $\alpha$ Parameter and Branching Ratio]

In order to adjust the $\alpha$ parameter, branching ratios of one or both of the input-side branching unit and the output-side branching unit of the Mach-Zehnder type optical modulator may be changed. However, when the branching ratio of the input-side branching unit and the branching ratio of the output-side branching unit vary, an extinction ratio of the Mach-Zehnder type optical modulator also changes, and therefore, it is required to adopt a branching ratio that satisfies both a requirement for the $\alpha$ parameter and a requirement for the extinction ratio.

A relationship between the branching ratio of the input-side branching unit and the branching ratio of the output-side branching unit of the Mach-Zehnder type optical modulator, and an $\alpha$ parameter and an extinction ratio will be described. As illustrated in FIG. 1, in the Mach-Zehnder type optical modulator 100, a cross-port power branching ratio of the input-side branching unit 20 is set to $\eta$ (0<$\eta$<1), and the cross-port power branching ratio of the output-side branching unit 50 is set to $\gamma$ (0<$\gamma$<1). Specifically, in the input-side branching unit 20, a signal passing rate from the input port 22 to the output port 23 is $\eta$, and a signal passing rate from the input port 22 to the output port 24 is 1-$\eta$. In the output-side branching unit 50, a signal passing rate from the input port 51 to the output port 53 is 1-$\gamma$, and a signal passing rate from the input port 52 to the output port 53 is $\gamma$. In the following description, it is assumed that when it is simply written as a branching ratio, it indicates a power branching ratio. Hereinafter, the cross-port power branching ratio is simply referred to as a cross-port branching ratio, and the bar-port power branching ratio is also simply referred to as a bar-port branching ratio.

An output electric field $E_{OUT}$ of the cross-port output of the Mach-Zehnder type optical modulator is described as Equations [2] to [4] below. In Equation [2], $\Phi_1$ and $\Phi_2$ are phase variation amounts caused by the arms 31 and 32, respectively. In Equations [3] and [4], $a_1$ and $a_2$ are coefficients of time-varying bias voltage in the phase modulation units 41 and 42, respectively, and a term of the bias voltage multiplied by this coefficient indicates time-varying components of the phase variation amounts. $\Phi_{B1}$ and $\Phi_{B2}$ indicate components that do not vary with time among the phase variation amounts caused by the bias voltages in the phase modulation units 41 and 42, respectively. $E_{IN}$ indicates an electric field of an optical signal to be input to the Mach-Zehnder type optical modulator (T. Kawanishi, K. Kogo, S. Oikawa, M. Izutsu, "Direct measurement of chirp parameters of high-speed Mach-Zehnder-type optical modulators", August 2001, Optics Communications, vol. 195, pp 399-404, H. Kim and A. Gnauck, "Chirp Characteristics of Dual-Drive Mach-Zehnder Modulator With a Finite DC Extinction Ratio", March 2002, IEEE Photonics Technol. Lett., vol. 14, no. 3, pp. 298-300, Y. Yamaguchi, A. Kanno, T. Kawanishi, M. Izutsu and H. Nakajima, "Precise Optical Modulation Using Extinction-Ratio and Chirp Tunable Single-Drive Mach-Zehnder Modulator", November 2017, J. Light. Technol., vol. 35, no. 21, pp. 4781-4788, Y. Yamaguchi, "Advanced Optical Modulator Based on Integrated Mach-Zehnder Interferometer", 2017, Doctoral Dissertation, Waseda University.).

[Mathematical 2]

$$E_{OUT} = \{\sqrt{\eta(1-\gamma)}\,e^{j\Phi_1} + \sqrt{(1-\eta)\gamma}\,e^{j\Phi_2}\}E_{IN}e^{j\omega t} \quad [2]$$
$$= [\{\sqrt{\eta(1-\gamma)}\cos\Phi_1 + \sqrt{(1-\eta)\gamma}\cos\Phi_2\} +$$
$$j\{\sqrt{\eta(1-\gamma)}\sin\Phi_1 + \sqrt{(1-\eta)\gamma}\sin\Phi_2\}]E_{IN}e^{j\omega t}$$

[Mathematical 3]

$$\Phi_1 = a_1 V(t) + \Phi_{B1} \quad [3]$$
$$\Phi_2 = a_2 V(t) + \Phi_{B2}$$

From Equation [2], power P of the output field $E_{OUT}$ and the phase $\Phi$ of the electric field can be described as Equations [5] and [6] below, respectively.

[Mathematical 5]

$$P = |E_{OUT}|^2 \quad [5]$$
$$= \{\eta(1-\gamma) + (1-\eta)\gamma + 2\sqrt{\eta(1-\eta)\gamma(1-\gamma)}\cos(\Phi_1 - \Phi_2)\}E_{IN}^2$$

[Mathematical 6]

$$\Phi = \tan^{-1}\left(\frac{\sqrt{\eta(1-\gamma)}\sin\Phi_1 + \sqrt{(1-\eta)\gamma}\sin\Phi_2}{\sqrt{\eta(1-\gamma)}\cos\Phi_1 + \sqrt{(1-\eta)\gamma}\cos\Phi_2}\right) \quad [6]$$

When Equations [5] and [6] are substituted into Equation [1], the α parameter is described as Equation [7].

[Mathematical 7]

$$\alpha = -\frac{1}{\sin(\Phi_1 - \Phi_2)} \left\{ \frac{1}{\sqrt{\eta(1-\eta)\gamma(1-\gamma)}} \frac{\eta(1-\gamma)a_1 + (1-\eta)\gamma a_2}{a_1 - a_2} + \frac{a_1 + a_2}{a_1 - a_2} \cos(\Phi_1 - \Phi_2) \right\} \quad [7]$$

Herein, it is assumed that the Mach-Zehnder type optical modulator 100 is operated at Quadrature Point (quartile point) of a transfer curve, and a relationship of Equation [8] is established for the phase variation amount of each arm when a small-signal input is considered.

[Mathematical 8]

$$\Phi_1 - \Phi_2 = \frac{\pi}{2} \quad [8]$$

By substituting Equation [8] into Equation [7], the α parameter can be described by Equation [9] below.

[Mathematical 9]

$$\alpha = -\frac{1}{\sqrt{\eta(1-\eta)\gamma(1-\gamma)}} \frac{\eta(1-\gamma)a_1 + (1-\eta)\gamma a_2}{a_1 - a_2} \quad [9]$$

Herein, it is assumed that the Mach-Zehnder type optical modulator 100 performs a full push-pull operation. In this case, although the sign of the phase variation amount with respect to the bias voltage of each arm is different, the absolute value becomes equal, and thus a relationship of Equation [10] is established.

[Mathematical 10]

$$a_1 = -a_2 \quad [10]$$

Therefore, the α parameter is described as in Equation [11] below by substituting Equation [10] into Equation [9].

[Mathematical 11]

$$\alpha = -\frac{\eta(1-\gamma) - (1-\eta)\gamma}{2\sqrt{\eta(1-\eta)\gamma(1-\gamma)}} = -\frac{\eta - \gamma}{2\sqrt{\eta(1-\eta)\gamma(1-\gamma)}} \quad [11]$$

In this case, it can be seen that the α parameter is determined only by the branching ratio η of the input-side branching unit 20 and the branching ratio γ of the output-side branching unit 50, as apparent from Equation [11]. In particular, it can be understood that the sign of the α parameter can be determined by appropriately setting the branching ratio η of the input-side branching unit 20 and the branching ratio γ of the output-side branching unit 50.

[Relationship Between Extinction Ratio and Branching Ratio]

Next, the relationship between the extinction ratio and the branching ratio will be described. Since an extinction ratio ER is determined by a ratio between a maximum value $P_{max}$ and a minimum value $P_{min}$ of the power P, the extinction ratio ER is described as Equation [12] below, from Equation [5]. In Equation [5], the maximum value $P_{max}$ is acquired when $\cos(\Phi_1 - \Phi_2) = 1$, and the minimum value $P_{min}$ is acquired when $\cos(\Phi_1 - \Phi_2) = -1$.

[Mathematical 12]

$$ER = 10 \log_{10} \frac{P_{max}}{P_{min}} \quad [12]$$

$$= 10 \log_{10} \frac{\eta(1-\gamma) + (1-\eta)\gamma + 2\sqrt{\eta(1-\eta)\gamma(1-\gamma)}}{\eta(1-\gamma) + (1-\eta)\gamma - 2\sqrt{\eta(1-\eta)\gamma(1-\gamma)}}$$

As apparent from Equation [12], it can be seen that the extinction ratio ER is determined only by the branching ratio η of the input-side branching unit 20 and the branching ratio γ of the output-side branching unit 50.

[Relationship Between α Parameter and Extinction Ratio]

From Equations [11] and [12], a relationship of Equation [13] below is established between the α parameter and the extinction ratio.

[Mathematica 13]

$$\alpha = \frac{1 + 10^{ER/10}}{1 - 10^{ER/10}} \frac{1 - \frac{\gamma(1-\eta)}{\eta(1-\gamma)}}{1 + \frac{\gamma(1-\eta)}{\eta(1-\gamma)}} \quad [13]$$

Figure 4:
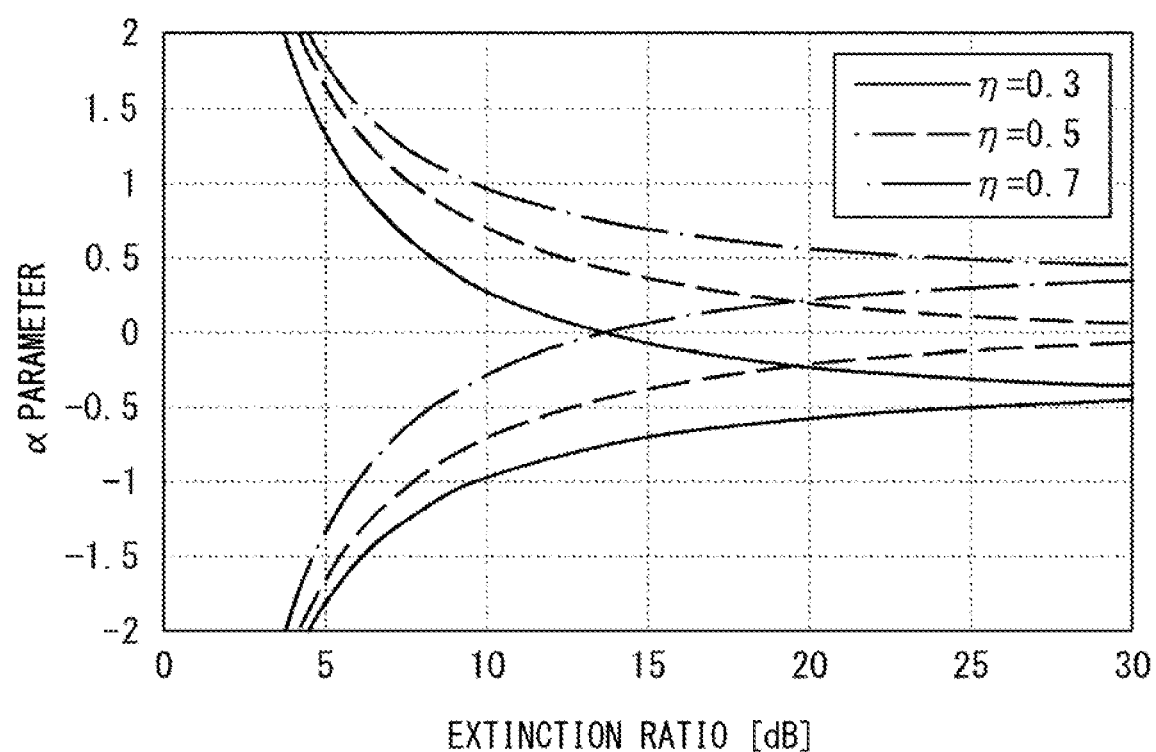
FIG. 4 is a diagram illustrating variation of an extinction ratio ER and an α parameter at γ=0.5 for different η values.

Hereinafter, a behavior of the extinction ratio ER and the α parameter when the branching ratio is varied will be examined. Herein, first, for simplification, the behavior of the extinction ratio ER and the α parameter when the branching ratio γ of the output-side branching unit 50 is fixed to 0.5 and the branching ratio η of the input-side branching unit 20 is varied will be described. FIG. 4 illustrates the extinction ratio ER and the α parameter when γ is fixed at 0.5 and only η is varied. From FIG. 4, it can be seen that the extinction ratio ER and the α parameter vary depending on the value of η, and that there are two positive and negative values for the same extinction ratio.

Figure 5:
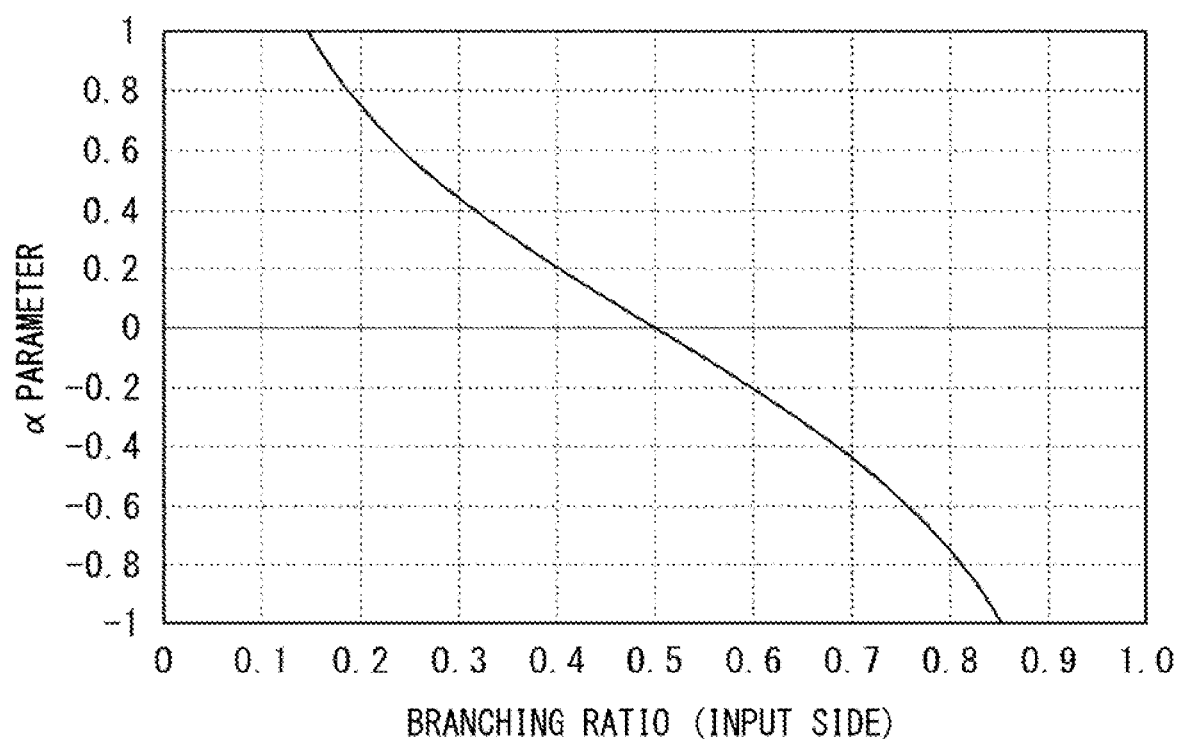
FIG. 5 is a diagram illustrating a calculation result of dependence of the α parameter on the branching ratio η of an input-side branching unit 20 when both the input-side branching unit 20 and an output-side branching unit 50 are constituted by a directional coupler and the branching ratio γ of the output-side branching unit 50 is fixed to 0.5.

Further, the relationship between the α parameter and the branching ratio η of the input-side branching unit 20 when the branching ratio γ of the output-side branching unit 50 is fixed to 0.5 will be further described. FIG. 5 illustrates a calculation result of dependence of the α parameter on the branching ratio η of the input-side branching unit 20 when the input-side branching unit 20 and the output-side branching unit 50 are both constituted by a directional coupler and the branching ratio γ of the output-side branching unit 50 is fixed to 0.5. In this case, as illustrated in FIG. 5, it can be seen that when the branching ratio η of the input-side branching unit 20 is larger than 0.5 (η>0.5), the α parameter becomes a negative value (α<0), and when the branching ratio η of the input-side branching unit 20 is smaller than 0.5 (1<0.5), the α parameter becomes a positive value (α>0). Needless to say, when the branching ratio η of the input-side branching unit 20 is 0.5, the α parameter becomes 0 (α=0).

As described above, since the positive dispersion tolerance is determined by the α parameter, long-distance transmission is enabled by appropriately adjusting the value of the extinction ratio ER and the sign of the α parameter and then imparting suitable dispersion tolerance. In an example of FIG. 3, assuming that a tolerance is imparted to the dispersion of SMF in a C band, the sign of the α parameter is determined to be negative. This determines the sign of the α parameter, and therefore, a one-to-one associated relationship is established between a combination of the branching ratio η and γ, the extinction ratio, and the α parameter. Therefore, it is possible to determine the combination of the branching ratios η and γ, based on the desired extinction ratio and the positive dispersion tolerance to be imparted (i.e., the value of α parameter). The following will be described in detail.

[Determination of Extinction Ratio and Branching Ratio]

In order to achieve a desired transmission characteristic, noise immunity when a signal is received by an optical receiver must be satisfied, and therefore, there is a range of values to be satisfied in the extinction ratio ER. Therefore, it is necessary to appropriately design the branching ratios η and γ and to achieve both the extinction ratio ER and the α parameter in order to achieve a desired transmission characteristic.

Note that, as the configuration of the Mach-Zehnder type optical modulator 100, a branch structure of two inputs and two outputs is assumed for each input and output, but the α parameter and the extinction ratio are determined in the same manner even when the input side has a branch structure of one input and two outputs and the output side has a branch structure of two inputs and one output. In short, the above-described discussion does not depend on the number of inputs and outputs of the I/O branch structure. Further, in the above description, attention is paid to the cross-port output of the modulator, but also in the bar port output, the α parameter is uniquely determined by the values of the branching ratios η and γ. The relationship between the extinction ratio, the α parameter, the branching ratios η and γ when the bar port output is used will be described later.

Hereinafter, the determination of the extinction ratio and the branching ratio with respect to the positive dispersion resistance to be imparted will be described. Herein, a case in which the following transmission conditions are assumed will be described. In transmission conditions 1 and 2 to be described below, the branching ratio η of the input-side branching unit 20 in a range in which the α parameter is a negative value, in which the positive tolerance can be imparted, will be examined.

Transmission Condition 1: Average Condition in SFP Optical Transceiver (SFP28)

Hereinafter, the Mach-Zehnder type optical modulator 100 will be described as being mounted on an SFP optical transceiver. Although the transmission distance required as an SFP optical transceiver varies depending on a situation, use of the mobile fronthaul of SFP 28 is assumed herein. The required specification at this time is 15 km in transmission distance, 25 Gbps in transmission rate, and 5 dB in extinction ratio lower limit. In addition, a wavelength dispersion D(λ) of the SMF uses 16.0 ps/nm/km as an average value of JT-G652 ("JT-G652 Characteristics of a single-mode optical fibre and cable", The Telecommunication Technology Committee, May 24, 2018, edition 1.1) of the TTC standard at a wavelength of 1550 nm.

Figure 6:
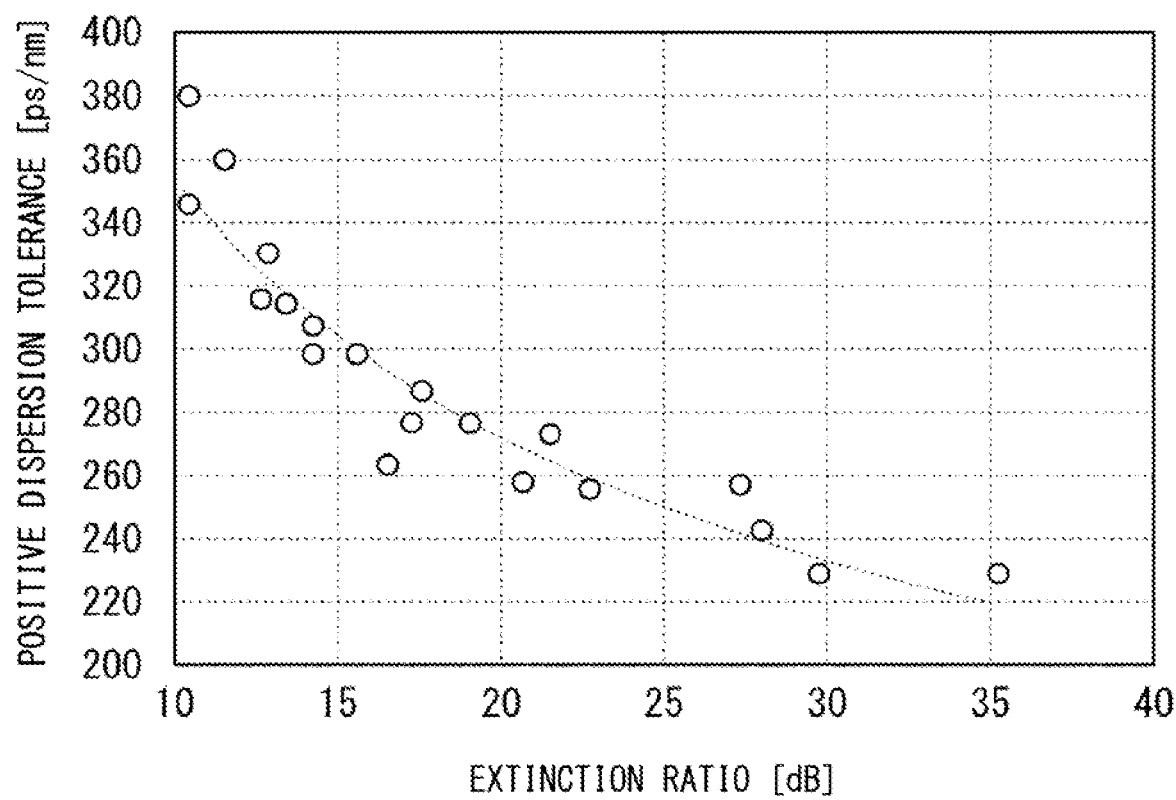
FIG. 6 is a diagram illustrating a relationship between an extinction ratio and measured positive dispersion tolerance.

FIG. 6 illustrates a relationship between an extinction ratio and a measured positive dispersion tolerance. Since the positive dispersion tolerance required when an optical signal is transmitted at 15 km in an SMF with dispersion of 16.0 ps/nm/km is 16.0×15=240 ps/nm, the extinction ratio is required to be 26 dB or less from experimental results. Therefore, the condition of the required extinction ratio ER is described by Equation [14] from the condition of FIG. 6 and the extinction ratio itself.

[Mathematical 14]

$$5\,[\text{dB}] \leq ER \leq 25\,[\text{dB}] \qquad [14]$$

Therefore, it can be seen that, under the transmission condition 1, the branching ratios η and γ can be determined in such a way as to satisfy the condition of the extinction ratio ER in Equation [14]. Herein, it is assumed that a directional coupler capable of freely changing the branching ratio η by design is used as the input-side branching unit 20. As for the output-side branching unit 50, for the sake of simplicity, the branching ratio γ is set to 0.5. The output-side branching unit 50 may be configured with, for example, a 2×2 multi-mode interferometer (MMI) coupler, a directional coupler, or the like. In the following description, unless otherwise specified, the output-side branching unit 50 is configured as a directional coupler.

Figure 7:
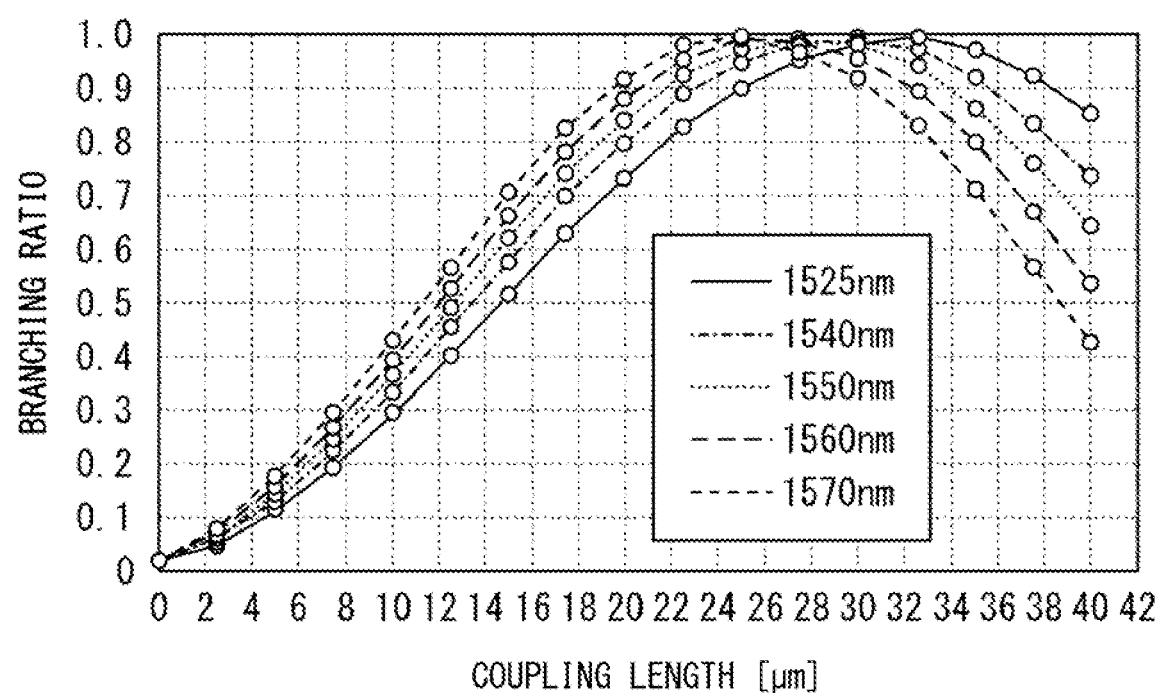
FIG. 7 is a diagram illustrating an actual measured value of a relationship between a coupling length and a branching ratio η for light having a wavelength of 1525 nm to 1570 nm.

In determining the branching ratio η to satisfy the condition of the extinction ratio, the wavelength dependence of the branching ratio of the directional coupler will be described. FIG. 7 illustrates an actual measured value of a relationship between a coupling length of the directional coupler and the branching ratio η for light having a wavelength of 1525 nm to 1570 nm. In FIG. 7, focusing on a certain coupling length, the branching ratio η varies depending on the wavelength, and thus the extinction ratio also varies in conjunction with this. Therefore, in order to impart positive dispersion tolerance to a wavelength-tunable device, it is necessary to satisfy an extinction ratio condition of Equation [14] in the entire range of a use wavelength range (herein, for example, 1525 nm to 1570 nm).

Figure 8:
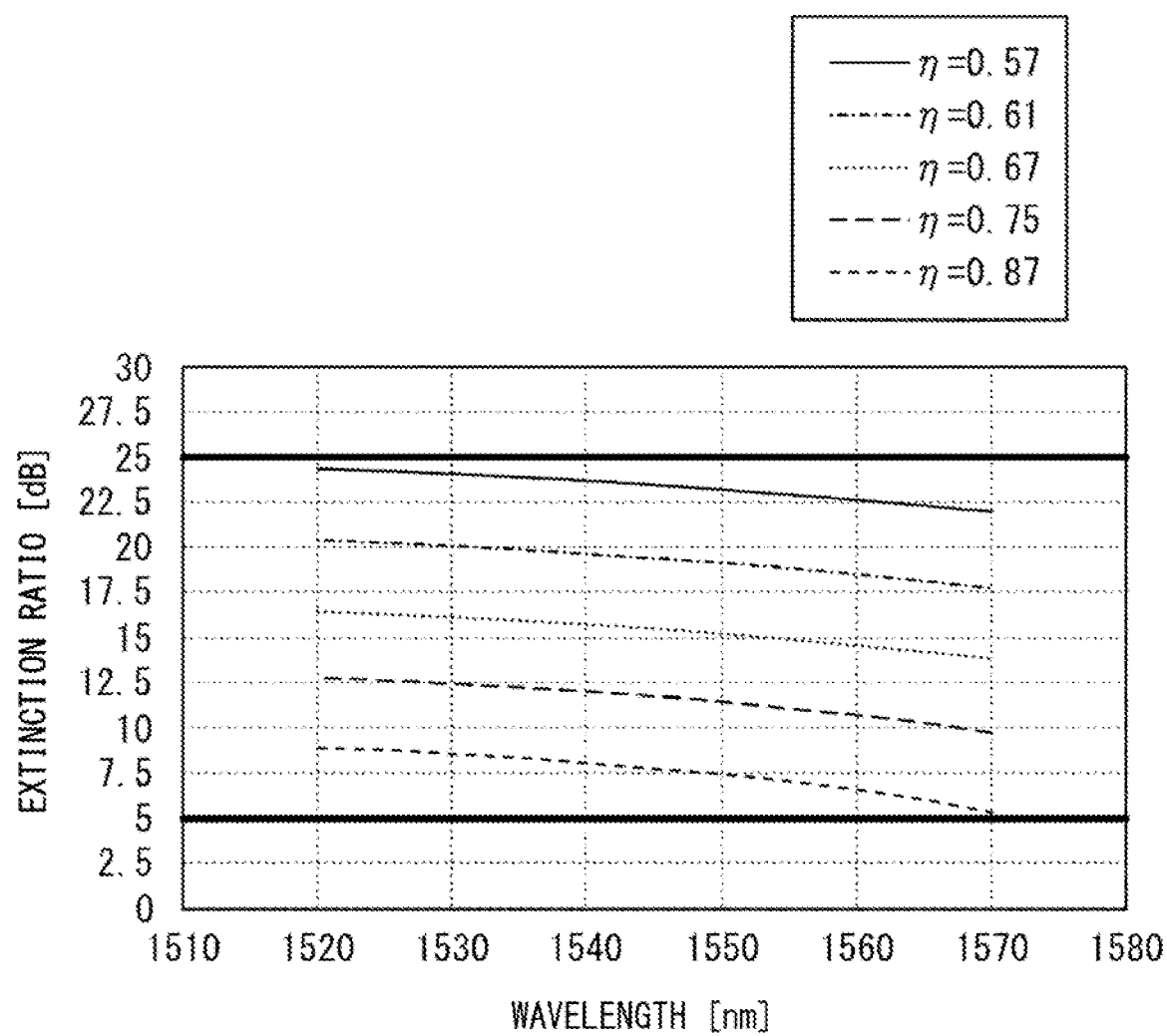
FIG. 8 is a diagram illustrating wavelength dependence of extinction ratio when the branching ratio η of the input-side branching portion 20 is varied by fixing the branching ratio γ of the output-side branching device 50 to 0.5 at a transmission distance of 15 km, i.e., in a range of 5 dB to 25 dB in extinction ratio.

Therefore, the wavelength dependence of the extinction ratio when the branching ratio η is varied in the use wavelength range of 1525 nm to 1570 nm is examined. Herein, the wavelength dependence of the extinction ratio has been calculated by using the wavelength dependence of the branching ratio η illustrated in FIG. 7. FIG. 8 illustrates the wavelength dependence of an extinction ratio when the branching ratio η of the input-side branching unit 20 is varied by fixing the branching ratio γ of the output-side branching unit 50 to 0.5 at the transmission distance of 15 km, i.e., in a range of 5 dB to 25 dB in extinction ratio. In FIG. 8, the output-side branching unit 50 is also constituted by a directional coupler having a branching ratio γ of 0.5 at a wavelength of 1550 nm. When the branching ratio γ of the output-side branching unit 50 at a wavelength of 1550 nm is set to 0.5, a range of the branching ratio η of the input-side branching unit 20 in which the extinction ratio surrounded by thick lines satisfies the range of 5 dB to 25 dB (Equation [14]) is calculated as 0.57 to 0.87.

Figure 9:
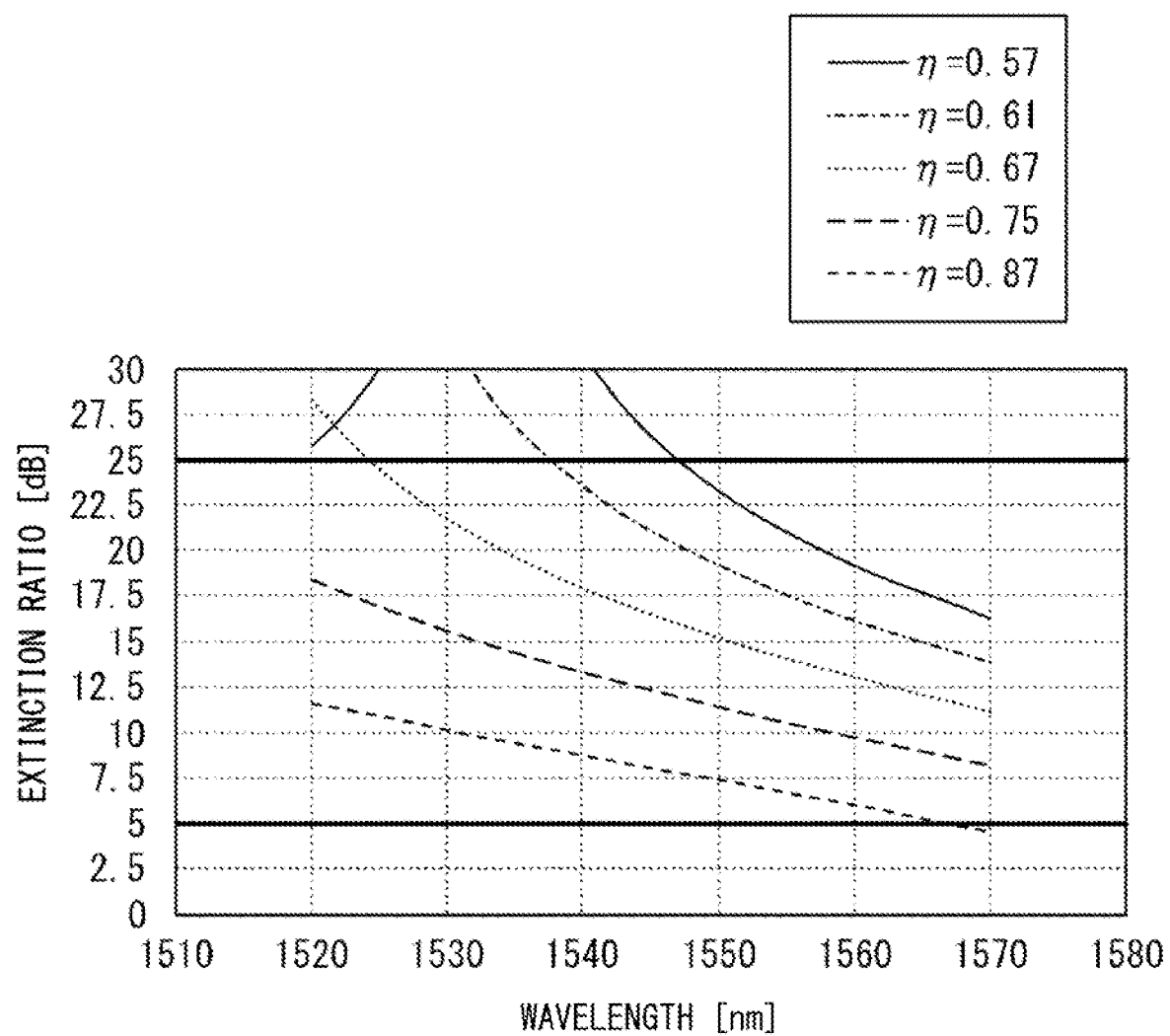
FIG. 9 is a diagram illustrating wavelength dependence of extinction ratio when the output-side branching unit 50 is constituted by a 2×2 MMI coupler (γ=0.5) at a transmission distance of 15 km, i.e., in a range of 5 dB to 25 dB in extinction ratio.

In the above, the case where both the input-side branching unit 20 and the output-side branching unit 50 are configured by the directional coupler has been described, but for comparison, a case where the output-side branching unit 50 is constituted by a 2×2 MMI coupler of γ=0.5 will be examined. FIG. 9 illustrates the wavelength dependence of an extinction ratio in a case where the output-side branching unit 50 is constituted by a 2×2 MMI coupler (γ=0.5) at a transmission distance of 15 km, i.e., in a range of 5 dB to 25 dB in extinction ratio. Since the MMI coupler ideally has a small wavelength dependence on the branching ratio, the wavelength characteristics are not considered herein. As illustrated in FIG. 9, the extinction ratio fluctuates greatly with respect to the wavelength due to the influence of the wavelength characteristics of the input-side branching unit 20 configured as a directional coupler. Thus, when the MMI coupler is used as the output-side branching unit 50, as compared with the case where the output-side branching unit 50 is configured as a directional coupler (FIG. 8), the wavelength dependence of the extinction ratio is deteriorated to such an extent that the range of Equation [14] cannot be satisfied due to the wavelength dependence.

Meanwhile, when both the input-side branching unit 20 and the output-side branching unit 50 are configured as directional couplers, the branching ratio fluctuates in the same direction with respect to the wavelength variation, and thus the wavelength characteristic with respect to the extinction ratio is cancelled out. Therefore, in order to reduce the wavelength dependence of the extinction ratio, it is desirable to configure both the input-side branching unit 20 and the output-side branching unit 50 as directional couplers. Therefore, as described above, in the present example embodiment, a directional coupler is used as the input-side branching unit 20 and the output-side branching unit 50.

Transmission Condition 2: Worst Condition in SFP Optical Transceiver (SFP28)

Next, when it is assumed that the transmission distance is 15 km, the transmission rate is 25 Gbps, the extinction ratio is 7.5 dB, and the wavelength dispersion is a worst value 18.6 ps/nm/km at the wavelength of 1550 nm of the TTC standard JT-G652, the required positive dispersion tolerance and the range of the value of the branching ratio η are calculated. The dispersion after 15 km transmission is 18.6× 15=279 ps. Based on FIG. 6, since the extinction ratio required for this dispersion is 17.542 [dB], the condition of the extinction ratio is described as Equation [15] below.

[Mathematical 15]

$$7.5\ [dB] \leq ER \leq 17.5\ [dB] \quad [15]$$

Figure 10:
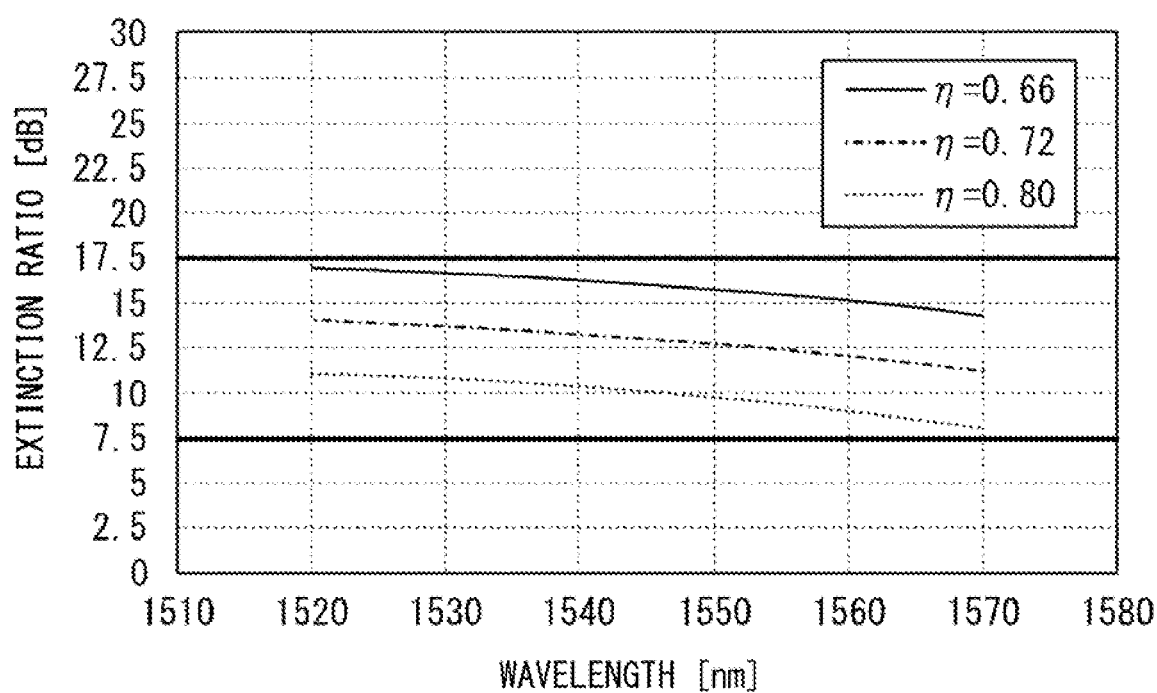
FIG. 10 is a diagram illustrating wavelength dependence of extinction ratio when an extinction ratio condition of Equation [15] is satisfied.

As in the case of the transmission condition 1, the branching ratio η on an input side of the input-side branching unit 20 which is a directional coupler is determined by setting the branching ratio γ of the output-side branching unit 50 which is a directional coupler to 0.5. FIG. 10 illustrates the wavelength dependence of the extinction ratio when an extinction ratio condition of Equation [15] is satisfied. The range of the branching ratio η of the input-side branching unit 20 satisfying the extinction ratio condition of Equation [15] is 0.66 to 0.80. Also in this range, the α parameter is negative and a positive dispersion tolerance can be imparted, and the transmission distance can be extended for the same modulation rate.

Figure 11:
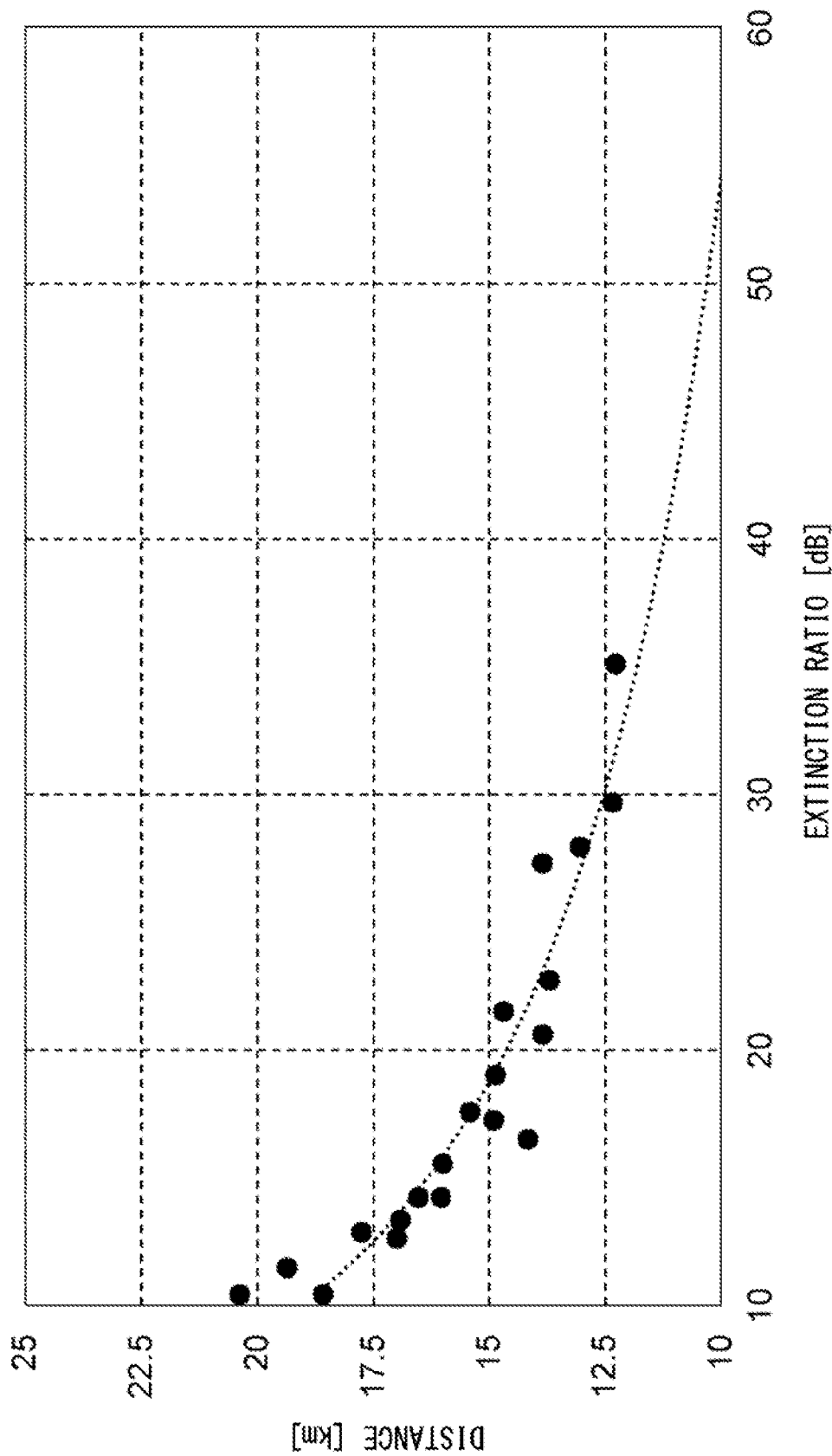
FIG. 11 is a diagram illustrating a relationship between a transmission distance and an upper limit of an extinction ratio in a transmission condition 2.

Next, a relationship between the transmission distance and an upper limit of the extinction ratio in the transmission condition 2 will be described. FIG. 11 illustrates the relationship between the transmission distance and the upper limit of the extinction ratio in the transmission condition 2. The upper limit of the extinction ratio varies with the transmission distance, and in FIG. 11, the upper limit of the extinction ratio at a transmission distance of 15 km is 17.5 dB, the upper limit of the extinction ratio at a transmission distance of 12.5 km is 30 dB, and the upper limit of the extinction ratio at a transmission distance of 10 km is 50 dB. At this time, an approximate curve of three significant digits by a least squares method, which indicates a relationship between a transmission distance D and an upper limit value $ER_{MAX}$ of the extinction ratio, is expressed by Equation [16] below.

[Mathematical 16]

$$D = 45.933 ER_{MAX}^{-0.382}\ [km] \quad [16]$$

Therefore, it goes without saying that an allowable range of the branching ratio η increases as the transmission distance is shortened.

As described above, according to the present configuration, it can be seen that the branching ratio η of the input-side branching unit 20 can be suitably designed in such a way that the positive dispersion tolerance can be imparted by adjusting the α parameter and a desired extinction ratio can be achieved.

Second Example Embodiment

In the first example embodiment, since it is possible to impart the positive dispersion tolerance when the α parameter represented by Equation [11] is a negative value, the branching ratio η of the input-side branching unit 20 is determined in a range (0.5<η<1.0) larger than 0.5 and smaller than 1. However, by using the Mach-Zehnder type optical modulator 100 as described below, it is possible to determine the branching ratio η of the input-side branching unit 20 in a range (0<η<0.5) larger than 0 and smaller than 0.5. The following will be described in detail.

The α parameter represented by Equation [11] described in the example embodiment is a positive value as described above in a range (0<η<0.5) in which the branching ratio η of the input-side branching unit 20 is larger than 0 and smaller than 0.5. Therefore, it is not possible to impart the positive dispersion tolerance as it is.

Meanwhile in the present example embodiment, in the Mach-Zehnder type optical modulator 100, inversion of a slope of a transfer curve and inversion of a modulated signal applied to each arm are combined and applied. Accordingly, even in a range in which the branching ratio η of the input-side branching unit 20 is larger than 0 and smaller than 0.5 (0<η<0.5), the α parameter can be set to a negative value, and as a result, a positive dispersion tolerance can be imparted. The following will be described in detail.

[Inverting the Slope of the Transfer Curve]

Figure 12:
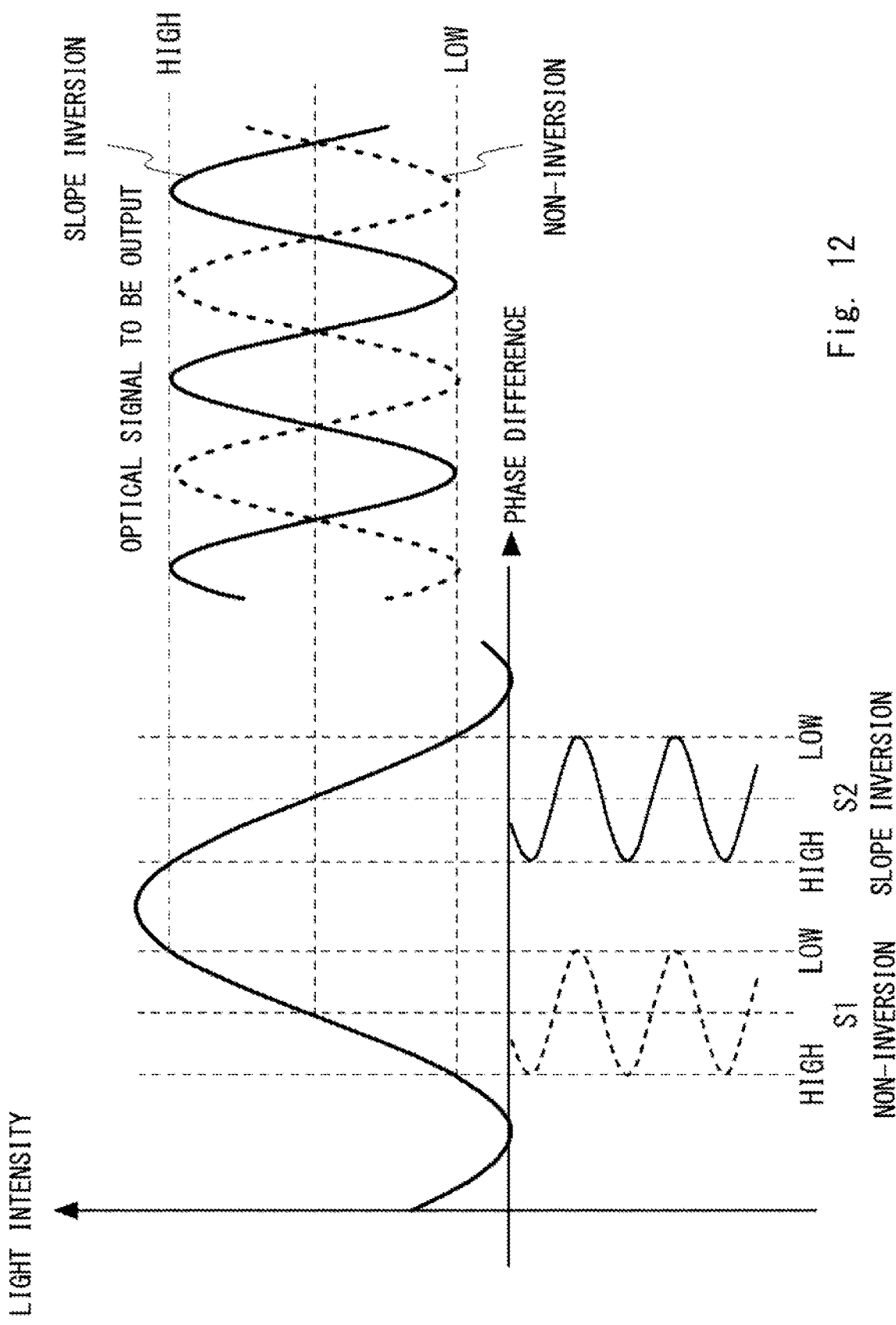
FIG. 12 is a diagram illustrating output light when a slope is inverted in a transfer curve of a Mach-Zehnder type optical modulator 100.

FIG. 12 illustrates output light when the slope is inverted in the transfer curve of the Mach-Zehnder type optical modulator 100. In FIG. 12, a modulated signal S1 indicated by a broken line represents a modulated signal in a case where the α parameter is a negative value in the first example embodiment. A modulated signal S2 indicated by a solid line represents a modulated signal acquired when the slope of the transfer curve is inverted. The fact that the slope is inverted means that the phase varies by π as compared with the case of the first example embodiment (i.e., a case of non-inversion), and therefore, in FIG. 12, the phase of the modulated signal S2 is shifted by π with respect to the modulated signal S1.

The inversion of the slope can be achieved, for example, by providing a heater in an optical waveguide constituting each of the arms 31 and 32. By heating the optical waveguide by the heater and controlling a refractive index of the optical waveguide by thermo-optical effect, the phase of light can be independently controlled in each of the arms 31 and 32. Therefore, by suitably heating the arms 31 and 32, the slope can be inverted as appropriate. Note that a method of inverting the slope is not limited to this, and other methods may be used as long as the phase of light can be independently controlled in each of the arms 31 and 32.

In this case, since the phase is inverted, Equation [8] described in the example embodiment is rewritten to the equation below.

[Mathematical 17]

$$\Phi_1 - \Phi_2 = -\frac{\pi}{2} \quad [17]$$

By substituting Equation [17] into Equation [7], the α parameter can be described by Equation [18] below.

[Mathematical 18]

$$\alpha = \frac{1}{\sqrt{\eta(1-\eta)\gamma(1-\gamma)}} \frac{\eta(1-\gamma)a_1 + (1-\eta)\gamma a_2}{a_1 - a_2} \quad [18]$$

In short, when the slope is inverted, in other words, when a phase difference is inverted (Equation [18]), it can be understood that the sign of the α parameter is reversed as compared with the case where the slope is not inverted (Equation [9] in the first example embodiment).

Assuming that the full push-pull operation of Equation [10] is similar, Equation [11] is rewritten to Equation [19] below.

[Mathematical 19]

$$\alpha = \frac{\eta(1-\gamma) - (1-\eta)\gamma}{2\sqrt{\eta(1-\eta)\gamma(1-\gamma)}} \quad [19]$$

In Equation [19], as in Equation [18], the sign of the α parameter is reversed. In short, when the slope is inverted as in the present example embodiment, the sign of the α parameter is inverted even when the branching ratio η of the input-side branching unit 20 is the same value as compared with the case in the first example embodiment.

Figure 13:
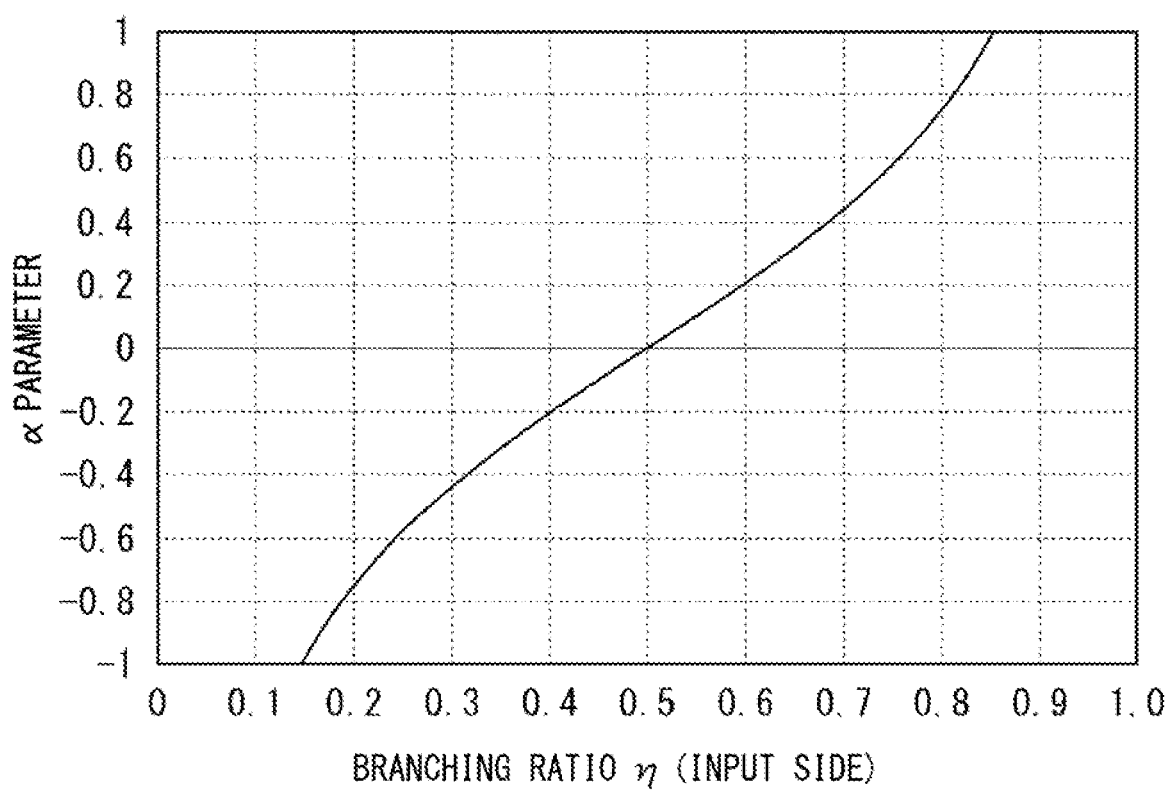
FIG. 13 is a diagram illustrating a calculation result of dependence of an α parameter on the branching ratio η of the input-side branching unit 20 when the input-side branching unit 20 and the output-side branching unit 50 are both constituted by a directional coupler, and when the branching ratio γ of the output-side branching unit 50 is fixed to 0.5, in a second example embodiment.

FIG. 13 illustrates a calculation result of dependence of the α parameter on the branching ratio η of the input-side branching unit 20 in a case where the input-side branching unit 20 and the output-side branching unit 50 are both constituted by the directional coupler and the branching ratio γ of the output-side branching unit 50 is fixed to 0.5 in the second example embodiment. When the slope is inverted, as illustrated in FIG. 13, it can be seen that the value of α with respect to the branching ratio η of the input-side branching unit 20 is inverted as compared with the first example embodiment illustrated in FIG. 5. Therefore, when the branching ratio η is larger than 0 and smaller than 0.5 (0<η<0.5), the α parameter becomes a negative value.

However, when the slope is inverted, as illustrated in FIG. 12, a level of the optical signal to be output with respect to a level of the modulated signal is inverted. In short, in the first example embodiment, levels of optical signals to be output when the modulated signals are HIGH and LOW are HIGH and LOW, respectively. On the other hand, when the slope is inverted as in the present example embodiment, the levels of the optical signals to be output when the modulated signals are HIGH and LOW are LOW and HIGH, respectively.

Therefore, since the level of the optical signal is inverted only by inverting the slope, the receiver cannot normally decode the optical signal being output from the Mach-Zehnder type optical modulator 100. Therefore, in the present example embodiment, the level of the optical signal is further inverted by inverting the modulated signal to be applied to each arm of the Mach-Zehnder type optical modulator 100 in such a way that the level of the optical signal is the same as the case in the first example embodiment.

[Inversion of Modulated Signal]

Figure 14:
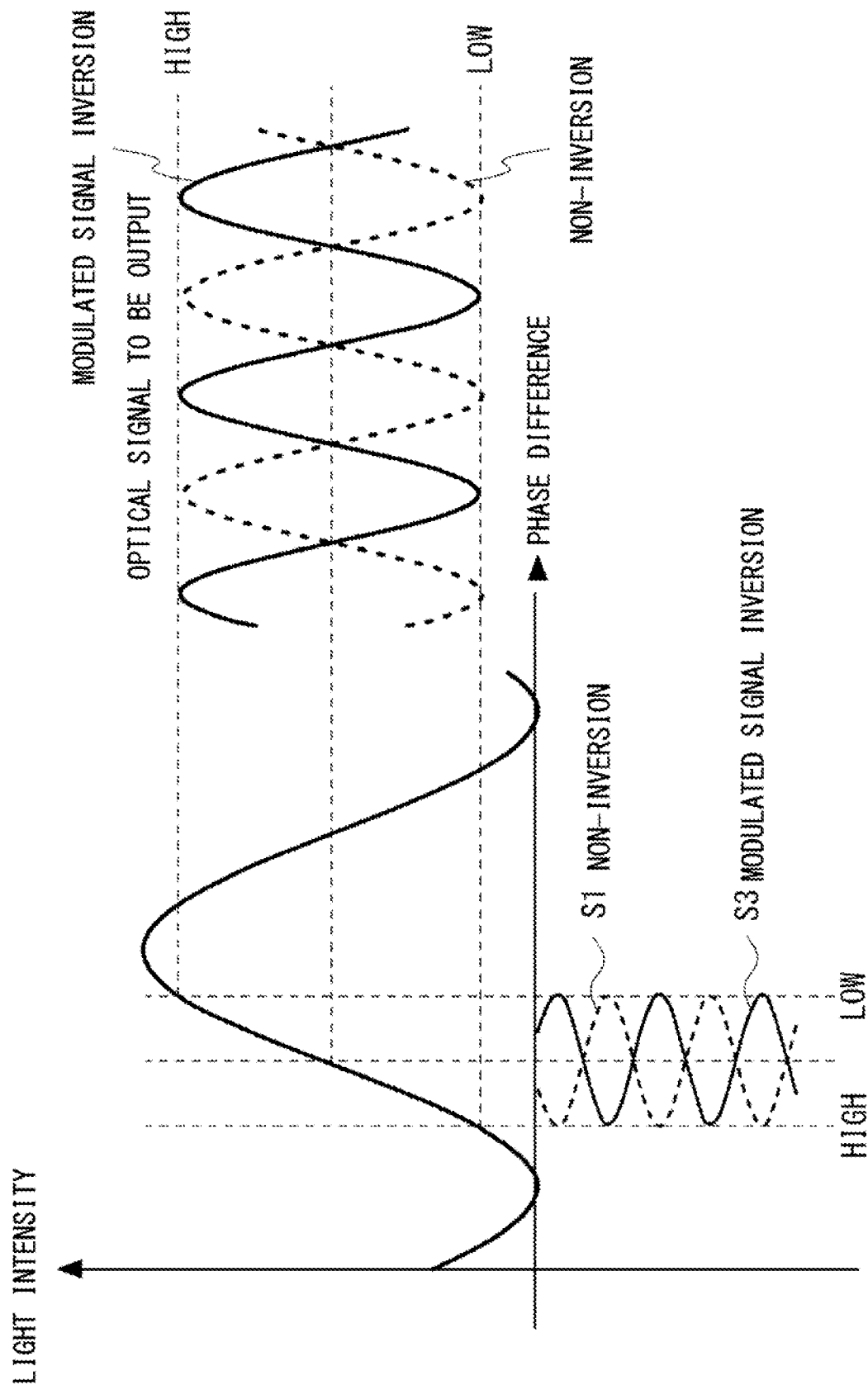
FIG. 14 is a diagram illustrating output light when a modulated signal is inverted.

FIG. 14 illustrates an optical signal when the modulated signal is inverted. In FIG. 14, a modulated signal S1 indicated by a broken line is the same as that in FIG. 12, and a modulated signal S3 indicated by a solid line indicates a modulated signal acquired by inverting the modulated signal S1. Herein, a non-inverted modulated signal is also referred to as a normal-phase modulated signal, and the inverted modulated signal S1 is also referred to as a reverse-phase modulated signal. In this case, as a matter of course, when the modulated signal is inverted, the level of the optical signal to be output with respect to the level of the modulated signal is inverted as compared with the case of non-inversion. In short, in the case of non-inversion, the levels of the optical signals to be output when the modulated signals are HIGH and LOW are HIGH and LOW, respectively. On the other hand, when the modulated signal is inverted, the levels of the optical signals to be output when the modulated signals are HIGH and LOW are LOW and HIGH, respectively.

Figure 15:
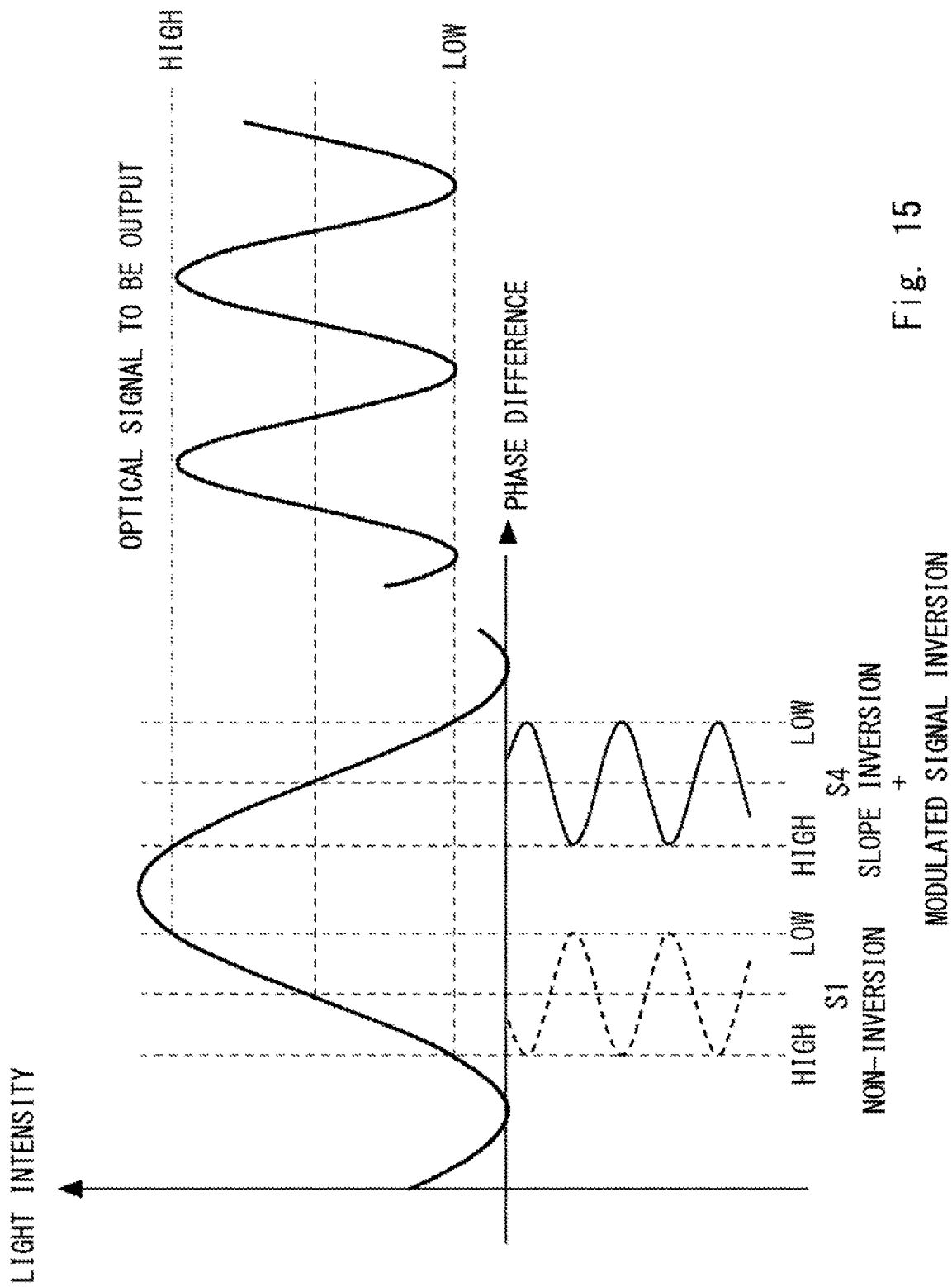
FIG. 15 is a diagram illustrating output light when the inversion of the slope of the transfer curve and the inversion of the modulated signal are applied in combination.

By inverting the modulated signal to be applied to each arm, the level of the optical signal to be output with respect to the level of the modulated signal is inverted once, and by inverting the modulated signal to be applied to each arm, the level of the optical signal to be output with respect to the level of the modulated signal is further inverted once, and then it returns to the original. FIG. 15 illustrates an output light when the inversion of the slope of the transfer curve and the inversion of the modulated signal are applied in combination. The modulated signal S1 indicated by a broken line is the same as that illustrated in FIG. 12, and the modulated signal S4 indicated by a solid line indicates a modulated signal acquired by inverting the slope and inverting the modulated signal S1. In this case, since the level of the optical signal to be output with respect to the level of the modulated signal S1 is inverted twice, as a result, the level of the output optical signal is the same as that of the first example embodiment.

Therefore, as in the present example embodiment, by inverting the slope and inverting the modulated signal to be applied to each arm of the Mach-Zehnder type optical modulator 100, it is possible to design the branching ratio η in the range larger than 0 and smaller than 0.5 (0<η<0.5).

Figure 16:
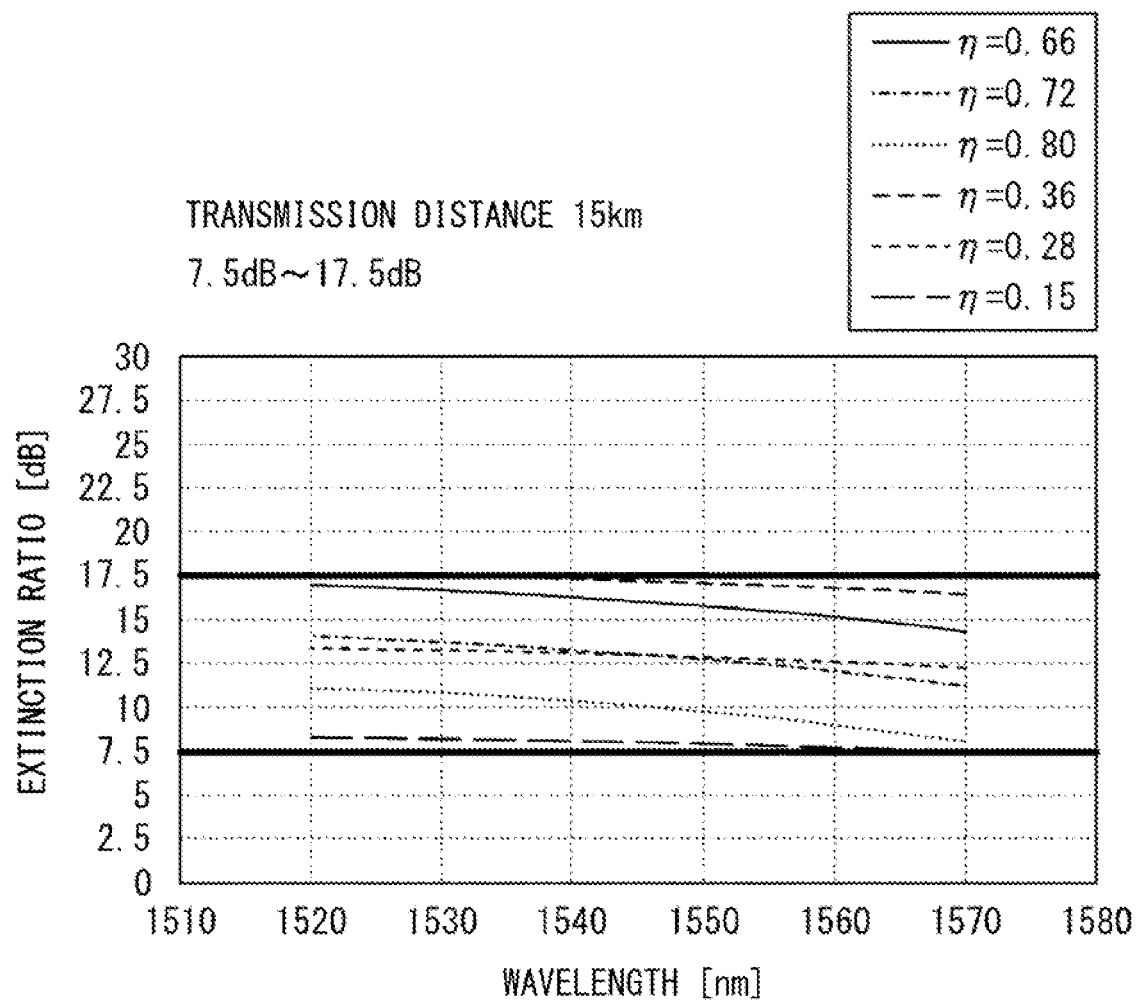
FIG. 16 is a diagram illustrating wavelength dependence of extinction ratio when the branching ratio η of the input-side branching unit 20 is varied in the second example embodiment.

Next, the wavelength dependence of the extinction ratio when the branching ratio η of the input-side branching unit 20 is varied in the second example embodiment under the transmission condition 2 will be examined. FIG. 16 illustrates the wavelength dependence of the extinction ratio when the branching ratio η of the input-side branching unit 20 is varied in the second example embodiment. Even in this case, as illustrated in FIG. 16, it can be seen that a desired extinction ratio can be achieved in the range of the branching ratio η of 0.36 to 0.15.

In FIG. 16, for comparison, the wavelength dependence of the extinction ratio in the range in which the branching ratio η of the input-side branching unit 20 is 0.66 to 0.80, which is illustrated in FIG. 10, is also displayed. Of course, since the wavelength dependence of the extinction ratio in the range of the branching ratio η of 0.66 to 0.80 is that in the first example embodiment, the slope inversion and the modulated signal inversion are not performed.

As can be seen from FIG. 16, in order to achieve desired dispersion compensation, it can be understood that the branching ratio η can be designed both in a range smaller than 0.5 and in a range larger than 0.5.

Further, compared with the first example embodiment in which the branching ratio η is in the range of 0.66 to 0.80 and the second example embodiment in which the branching ratio η is in the range of 0.36 to 0.15, it can be seen that the wavelength dependence of the extinction ratio is lower in the second example embodiment than in the first example embodiment.

Figure 17:
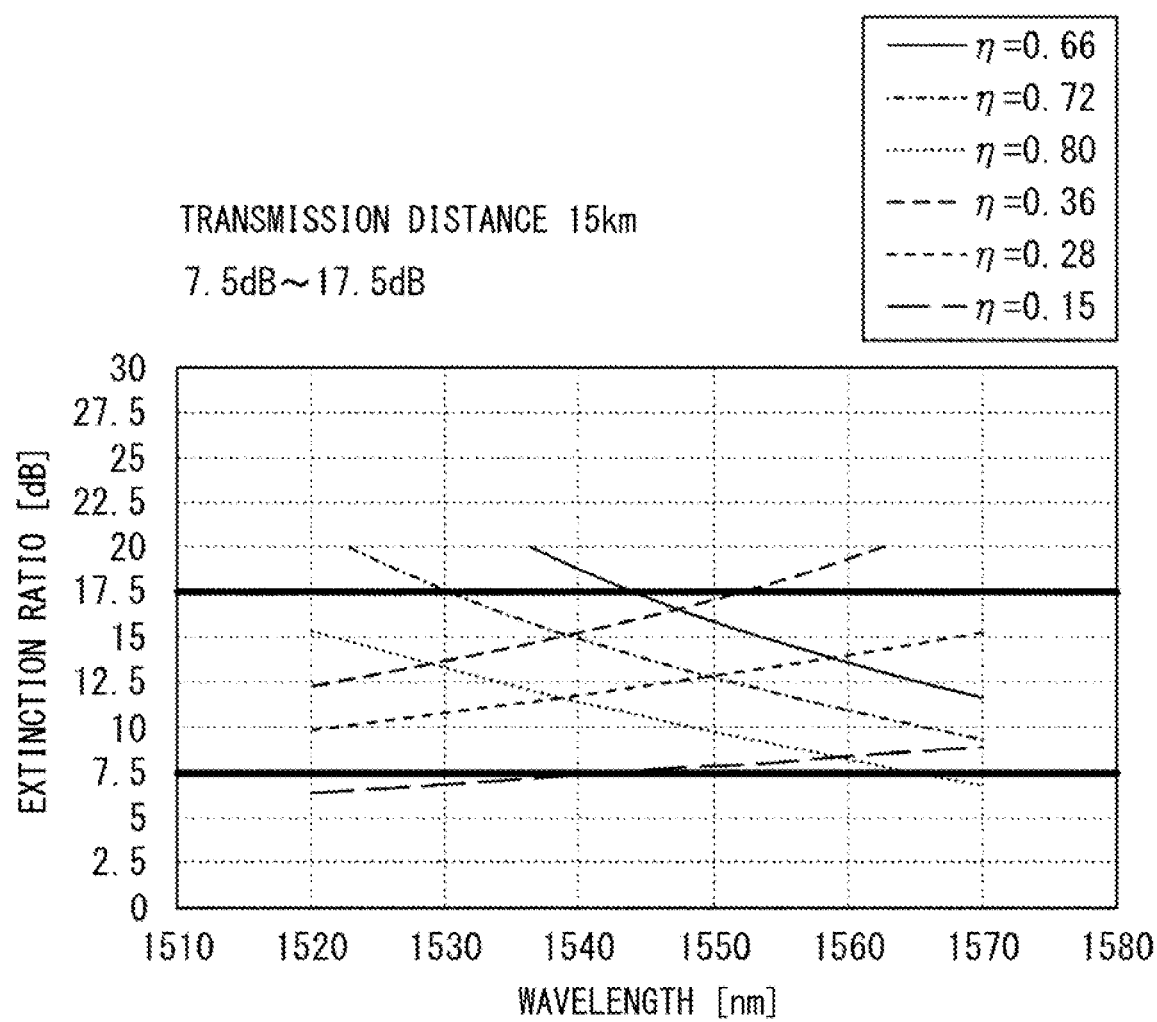
FIG. 17 is a diagram illustrating wavelength dependence of extinction ratio when the output-side branching unit is configured as a 2×2 MMI coupler.

Next, as a comparative example, the wavelength dependence of the extinction ratio in the case where the output-side branching unit 50 is configured as a 2×2 MMI coupler is also examined. FIG. 17 illustrates the wavelength dependence of the extinction ratio when the output-side branching unit 50 is configured as a 2×2 MMI coupler. When the output-side branching unit 50 is configured as a 2×2 MMI coupler, it can be seen that the wavelength dependence of the extinction ratio increases regardless of the value of the branching ratio η as in the case of FIG. 9. Therefore, in order to reduce the wavelength dependence of the extinction ratio, it is desirable to configure both the input-side branching unit 20 and the output-side branching unit 50 as directional couplers.

Third Example Embodiment

In the above-described example embodiment, for the sake of simplicity, the case where the branching ratio γ of the output-side branching unit 50 is fixed to 0.5 has been described. However, it is also possible to set the branching ratio γ of the output-side branching unit 50 to a value other than 0.5. Herein, a case where the branching ratio γ of the output-side branching unit 50 is a value other than 0.5 will be described.

[Transmission Condition 3]

Herein, a case where a transmission distance is 12.5 km, i.e., an upper limit of the extinction ratio is 30 dB, and a lower limit is 5 dB which is the same as the transmission condition 1, will be described as a transmission condition 3. Herein, too, the input-side branching unit 20 and the output-side branching unit 50 are configured as directional couplers.

Comparative Example: When the Branching Ratio γ of the Output-side Branching Unit 50 is Set to 0.5

Figure 18:
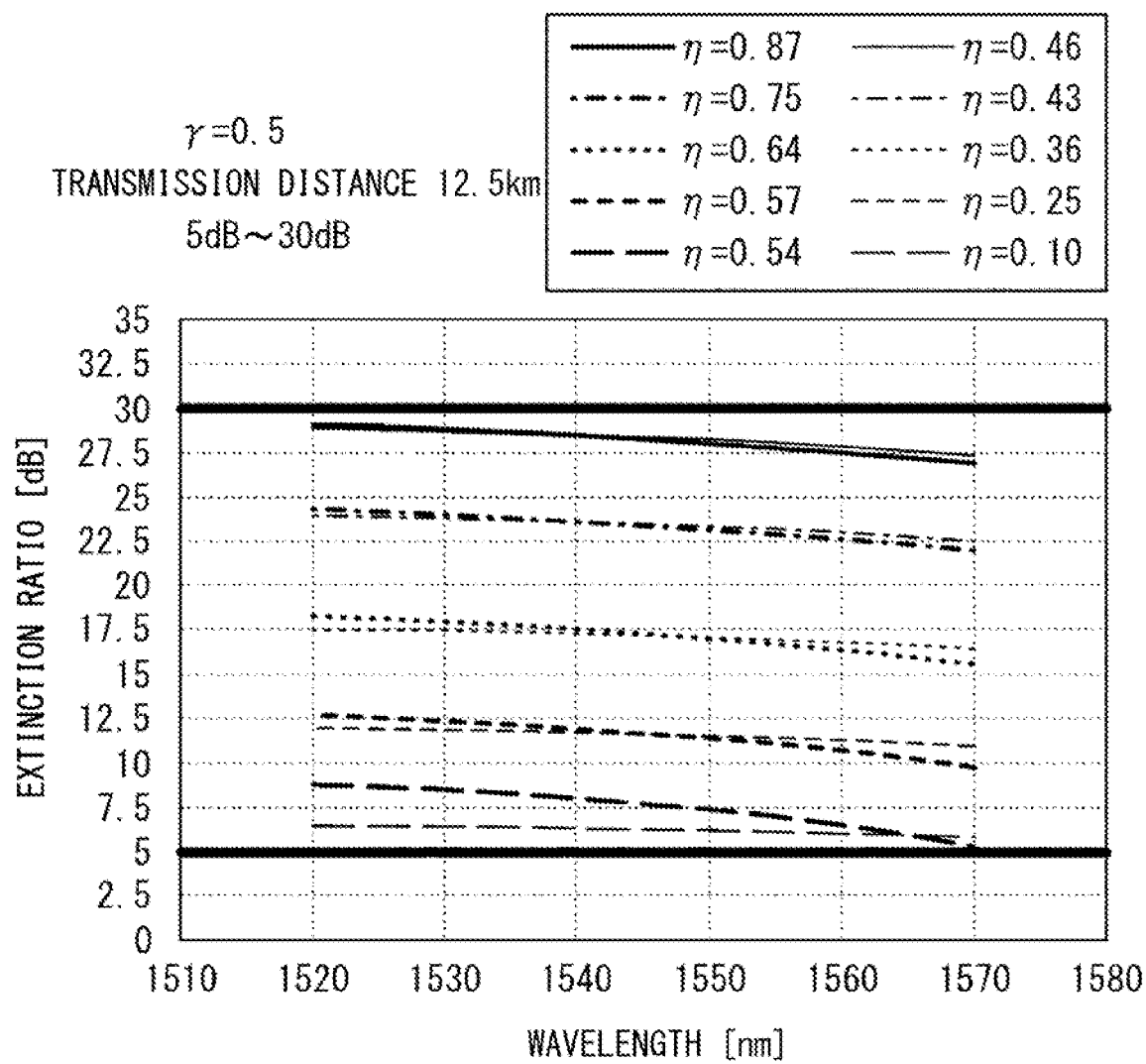
FIG. 18 is a diagram illustrating wavelength dependence of extinction ratio when the branching ratio γ of the output-side branching unit is set to 0.5 at a transmission distance of 12.5 km, i.e., in a range of 5 dB to 30 dB in extinction ratio.

FIG. 18 illustrates the wavelength dependence of the extinction ratio when the branching ratio γ of the output-side branching unit 50 is set to 0.5 in the same manner as described above at the transmission distance of 12.5 km, i.e., in a range of 5 dB to 30 dB in extinction ratio. In this case, a desired extinction ratio can be achieved in a range in which the branching ratio η of the input-side branching unit 20 is 0.46 to 0.10 and 0.54 to 0.87.

Modified Example: When the Branching Ratio γ of the Output-side Branching Unit is Set to 0.4

Figure 19:
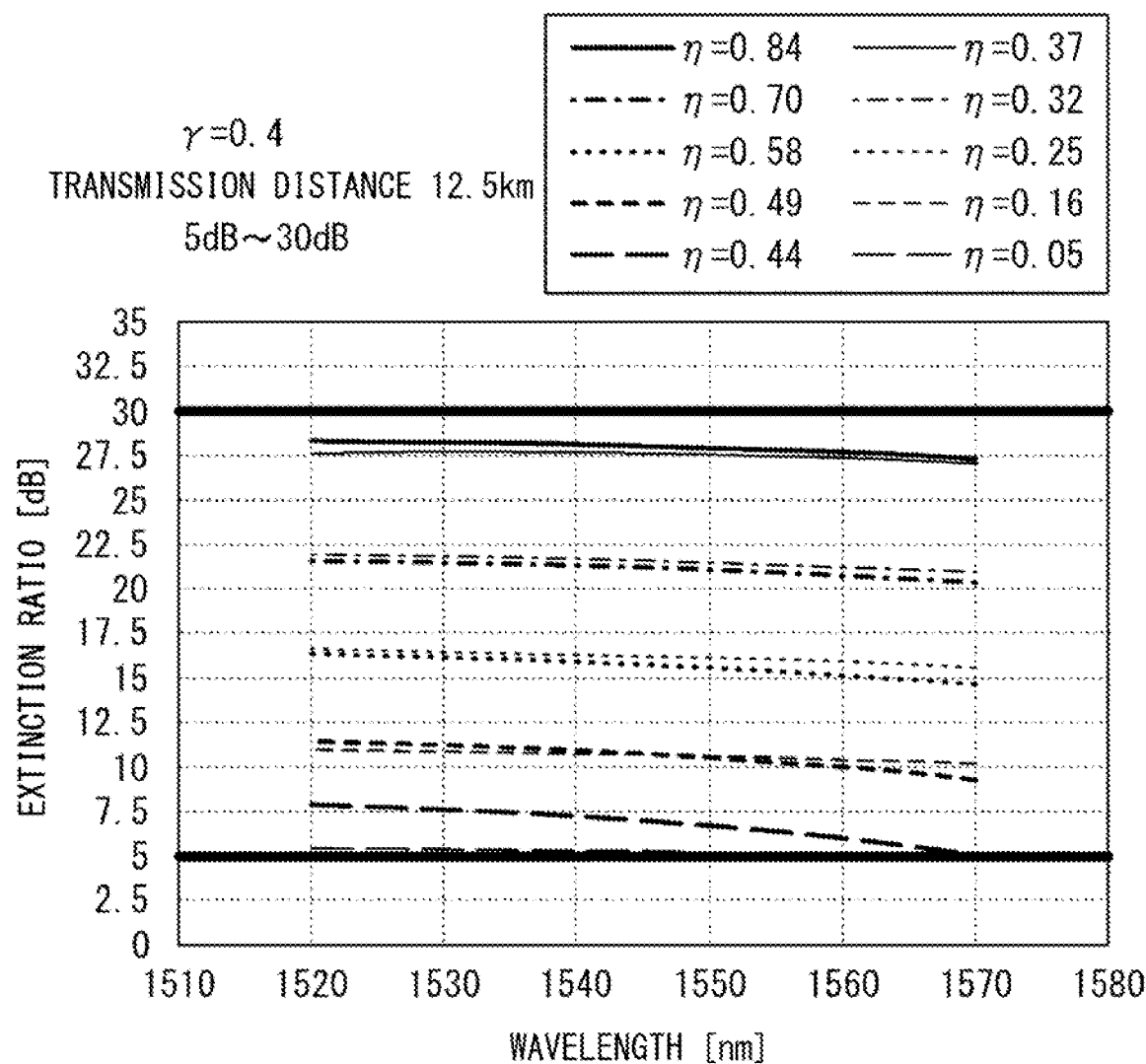
FIG. 19 is a diagram illustrating wavelength dependence of extinction ratio when the branching ratio γ of the output-side branching unit is changed to 0.4 at a transmission distance of 12.5 km, i.e., in a range of 5 dB to 30 dB in extinction ratio.

FIG. 19 illustrates the wavelength dependence of the extinction ratio when the branching ratio γ of the output-side branching unit 50 is changed to 0.4 at the transmission distance of 12.5 km, i.e., in the range of 5 dB to 30 dB in extinction ratio. In this case, a desired extinction ratio can be achieved in a range in which the branching ratio η of the input-side branching unit 20 is 0.37 to 0.05 and 0.44 to 0.84.

When the branching ratio η of the input-side branching unit 20 falls within the range of 0.37 to 0.05, it responds to a state in which the slope is not inverted and the modulated signal is not inverted. Further, when the branching ratio η of the input-side branching unit 20 falls within the range of 0.44 to 0.84, it responds to a state in which the slope is inverted and the modulated signal is inverted.

From the above, it can be understood that even when both the branching ratio η of the input-side branching unit 20 and the branching ratio γ of the output-side branching unit 50 are set to a value other than 0.5, a desired positive dispersion tolerance can be imparted, and the branching ratios η and γ capable of achieving a desired extinction ratio can be appropriately designed.

Fourth Example Embodiment

In the above-described example embodiment, the case has been described in which the output of the Mach-Zehnder type optical modulator 100 is a cross-port output. However, the output is not limited thereto, and may be a bar port output. Hereinafter, a case of the bar port output will be described.

Figure 20:
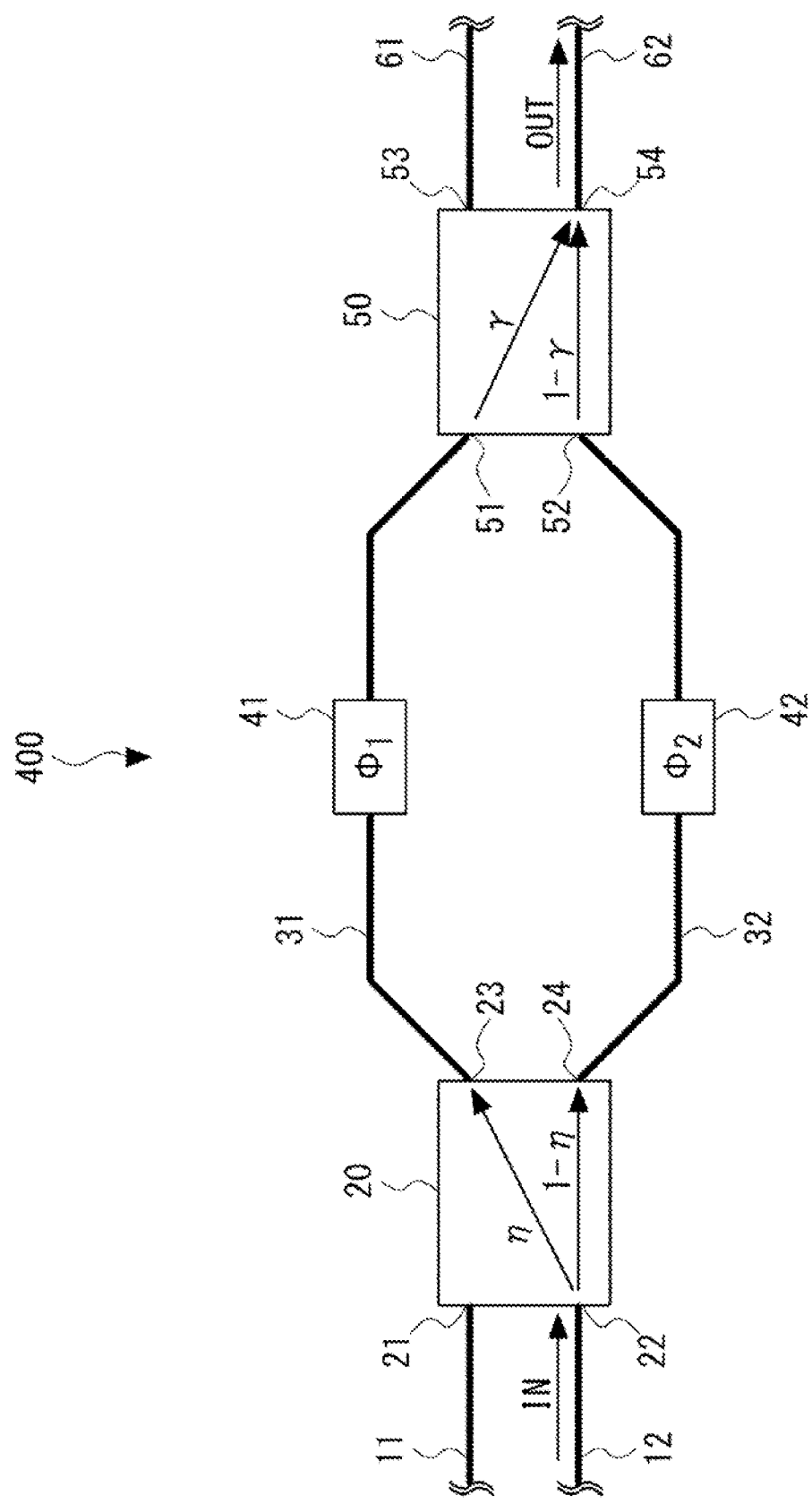
FIG. 20 is a diagram schematically illustrating a configuration of a Mach-Zehnder type optical modulator 400 according to a fourth example embodiment.

FIG. 20 schematically illustrates a configuration of a Mach-Zehnder type optical modulator 400 according to a fourth example embodiment. In the Mach-Zehnder type optical modulator 400, an output source of output light is changed from the output port 53 of the cross-port path to the output port 54 of the bar-port path as compared with the Mach-Zehnder type optical modulator 100 in FIG. 1.

When the bar port output is used in the Mach-Zehnder type optical modulator, an output electric field $E_{OUT}$ of the bar port output of the Mach-Zehnder type optical modulator is expressed by Equation [20] below. Equation [20] is acquired by replacing the cross-port branching ratio γ of the output-side branching unit 50 with the bar-port branching ratio (1-γ) thereof, in Equation [2] of the output electric field of the cross-port output of the Mach-Zehnder type optical modulator.

[Mathematical 20]

$$E_{OUT} = \{\sqrt{\eta\gamma}\,e^{j\Phi_1} + \sqrt{(1-\eta)(1-\gamma)}\,e^{j\Phi_2}\}E_{IN}e^{j\omega t} \quad [20]$$
$$= [\{\sqrt{\eta\gamma}\cos\Phi_1 + \sqrt{(1-\eta)(1-\gamma)}\cos\Phi_2\} +$$
$$j\{\sqrt{\eta\gamma}\sin\Phi_1 + \sqrt{(1-\eta)(1-\gamma)}\sin\Phi_2\}]E_{IN}e^{j\omega t}$$

From Equation [20], power P of the output electric field $E_{OUT}$ can be described as Equation [21] below.

[Mathematical 21]

$$P = |E_{OUT}|^2 \quad [21]$$
$$= \{\eta\gamma + (1-\eta)(1-\gamma) + 2\sqrt{\eta(1-\eta)\gamma(1-\gamma)}\cos(\Phi_1 - \Phi_2)\}E_{IN}^2$$

As in the first example embodiment, assuming that the slope and the modulated signal are non-inverting, an α parameter can be described by Equation [22] below.

[Mathematical 22]

$$\alpha = -\frac{\eta\gamma - (1-\eta)(1-\gamma)}{2\sqrt{\eta(1-\eta)\gamma(1-\gamma)}} \quad [22]$$

In this case, an extinction ratio ER can be described by Equation [23] below.

[Mathematical 23]

$$ER = 10\log_{10}\frac{P_{max}}{P_{min}}$$
$$= 10\log_{10}\frac{\eta\gamma + (1-\eta)(1-\gamma) + 2\sqrt{\eta(1-\eta)\gamma(1-\gamma)}}{\eta\gamma + (1-\eta)(1-\gamma) - 2\sqrt{\eta(1-\eta)\gamma(1-\gamma)}} \quad [23]$$

Needless to say, Equations [21] to [23] are also acquired by replacing the cross-port branching ratio γ of the output-side branching unit 50 with the bar-port branching ratio (1-γ) thereof in each of Equations [5], [11], and [12].

As described above, it can be seen that even in the case of using the bar port output, similarly, while imparting positive dispersion tolerance by adjusting the α parameter, the branching ratio η of the input-side branching unit 20 and the branching ratio γ of the output-side branching unit 50 can be suitably designed in such a way that the desired extinction ratio can be achieved.

Therefore, the bar port output of the Mach-Zehnder type optical modulator 100 can be used in the same manner as the cross-port output.

Other Example Embodiments

The present disclosure is not limited to the above-described example embodiments, and can be appropriately modified without departing from the spirit. The above-described Mach-Zehnder type optical modulator may be manufactured by various material systems and processes, and may be manufactured as, for example, a silicon photonics device.

The first to fourth example embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

The whole or part of the example embodiments disclosed above can be described as, but not limited to, the following supplementary notes.
(Supplementary Note 1)
A Mach-Zehnder type optical modulator including: a first directional coupler configured to branch input light into a cross-port path having a cross-port branching ratio η and a bar-port path having a bar-port branching ratio 1-η; a first arm configured to propagate light from the cross-port path of the first directional coupler; a second arm configured to propagate light from the bar-port path of the first directional coupler; a second directional coupler configured to have two inputs and two outputs, input light from the first arm to one input and light from the second arm to another input, and have a cross-port branching ratio of γ and a bar-port branching ratio of 1-γ; and a phase modulator configured to provide a phase difference between the light propagating through the first arm and the light propagating through the second arm, in which the cross-port branching ratio η and the bar-port branching ratio 1-η, and the cross-port branching ratio γ and the bar-port branching ratio 1-γ are determined in such a way that an α parameter being a chirp parameter is a negative value.

(Supplementary Note 2)
The Mach-Zehnder type optical modulator according to Supplementary note 1, in which the cross-port branching ratio η, the bar-port branching ratio 1-η, the cross-port branching ratio γ, and the bar-port branching ratio 1-γ are determined in such a way that the cross-port branching ratio η and the bar-port branching ratio 1-η do not have the same value or the cross-port branching ratio γ and the bar-port branching ratio 1-γ do not have the same value.

(Supplementary Note 3)
The Mach-Zehnder type optical modulator according to Supplementary note 2, in which, when a phase difference between the light passing through the first arm and the light passing through the second arm is n/2, the phase modulation unit provides a positive-phase modulated signal to each of the first and second arms, and
   output light is output from an output of the second directional coupler serving as a cross port with respect to the input light.

(Supplementary Note 4)
The Mach-Zehnder type optical modulator according to Supplementary note 3, in which the cross-port branching ratio η is larger than the cross-port branching ratio γ.

(Supplementary Note 5)
The Mach-Zehnder type optical modulator according to Supplementary note 4, in which, when a transmission path of the output light is composed of a single-mode optical fiber, a transmission rate is 25 Gbps, γ=0.5, and an upper limit value of wavelength dispersion is an upper limit value 18.6 ps/nm/km of wavelength dispersion at a wavelength of 1550 nm of TTC standard JT-G652, a relationship between a transmission distance D [km] of the output light and an upper limit value $ER_{MAX}$ of an extinction ratio is expressed by Equation [1] below.

[Mathematical 24]

$$D = 45.933 ER_{MAX}^{-0.382} \text{ [km]} \quad [24]$$

(Supplementary Note 6)
The Mach-Zehnder type optical modulator according to Supplementary note 5, in which the cross-port branching ratio η is set to 0.66 or more in such a way that an extinction ratio of the output light is equal to or less than an upper limit value 17.5 dB of the extinction ratio when a transmission distance of the output light is 15 km.

(Supplementary Note 7)
The Mach-Zehnder type optical modulator according to Supplementary note 5 or 6, in which the cross-port branching ratio is set to 0.80 or less in such a way that an extinction ratio of the output light is equal to or higher than a lower limit value 7.5 dB of an extinction ratio for ensuring sensitivity of the output light on a reception side.

(Supplementary Note 8)
The Mach-Zehnder type optical modulator according to Supplementary note 2, in which, when a phase difference between the light passing through the first arm and the light passing through the second arm is π/2, the phase modulation unit provides a positive-phase modulated signal to each of the first and second arms, and output light is output from an output of the second directional coupler serving as a bar port with respect to the input light.

(Supplementary Note 9)
The Mach-Zehnder type optical modulator according to Supplementary note 2, in which, when a phase difference between the light passing through the first arm and the light passing through the second arm is −π/2, the phase modulation unit provides a reversed-phase modulated signal to each of the first and second arms, and output light is output from an output of the second directional coupler serving as a cross port with respect to the input light.

(Supplementary Note 10)

The Mach-Zehnder type optical modulator according to Supplementary note 9, in which the cross-port branching ratio η is set to 0.36 or less in such a way that an extinction ratio of the output light is equal to or less than an upper limit value 17.5 dB of the extinction ratio when a transmission distance of the output light is 15 km.

(Supplementary Note 11)

The Mach-Zehnder type optical modulator according to Supplementary note 9, in which the cross-port branching ratio is set to 0.1 or more in such a way that an extinction ratio of the output light is equal to or higher than a lower limit value 7.5 dB of an extinction ratio for ensuring sensitivity of the output light on a reception side.

(Supplementary Note 12)

The Mach-Zehnder type optical modulator according to Supplementary note 2, in which, when a phase difference between the light passing through the first arm and the light passing through the second arm is $-\pi/2$, the phase modulation unit provides a reversed-phase modulated signal to each of the first and second arms, and output light is output from an output of the second directional coupler serving as a bar port with respect to the input light.

(Supplementary Note 13)

An optical transceiver including: a transmitter configured to transmit an optical signal having a light source and a Mach-Zehnder type optical modulator configured to modulate light from the light source; a receiver configured to receive an optical signal to be input; and a control unit configured to control the transmitter and the receiver, in which the Mach-Zehnder type optical modulator includes: a first directional coupler configured to branch light being input from the light source into a cross-port path having a cross-port branching ratio η and a bar-port path having a bar-port branching ratio 1-η; a first arm configured to propagate light from the cross-port path of the first directional coupler; a second arm configured to propagate light from the bar-port path of the first directional coupler; a second directional coupler configured to have two inputs and two outputs, input light from the first arm to one input and light from the second arm to another input, and have a cross-port branching ratio of γ and a bar-port branching ratio of 1-γ; and a phase modulation unit configured to provide a phase difference between the light propagating through the first arm and the light propagating through the second arm, in which the cross-port branching ratio η and the bar-port branching ratio 1-η, and the cross-port branching ratio γ and the bar-port branching ratio 1-γ are determined in such a way that an α parameter being a chirp parameter is a negative value.

(Supplementary Note 14)

A dispersion compensation method including: branching input light into a cross-port path having a cross-port branching ratio η and a bar-port path having a bar-port branching ratio 1-η by a first directional coupler; inputting light from the cross-port path of the first directional coupler to a first arm; inputting light from the bar-port path of the first directional coupler to a second arm; inputting light from the first arm to one input of a second directional coupler with two inputs and two outputs and inputting light from the second arm to another input, the second directional coupler having a cross-port branching ratio of γ and a bar-port branching ratio of 1-γ; providing a phase difference between the light propagating through the first arm and the light propagating through the second arm; and determining the cross-port branching ratio η and the bar-port branching ratio 1-η, and the cross-port branching ratio γ and the bar-port branching ratio 1-γ in such a way that an α parameter being a chirp parameter is a negative value.

What is claimed is:

1. A Mach-Zehnder type optical modulator comprising:
   a first directional coupler configured to branch input light into a cross-port path having a cross-port branching ratio η and a bar-port path having a bar-port branching ratio 1-η;
   a first arm configured to propagate light from the cross-port path of the first directional coupler;
   a second arm configured to propagate light from the bar-port path of the first directional coupler;
   a second directional coupler configured to have two inputs and two outputs, input light from the first arm to one input and light from the second arm to another input, and have a cross-port branching ratio of γ and a bar-port branching ratio of 1-γ; and
   a phase modulator configured to provide a phase difference between the light propagating through the first arm and the light propagating through the second arm,
   wherein the cross-port branching ratio η and the bar-port branching ratio 1-η, and the cross-port branching ratio γ and the bar-port branching ratio 1-γ are determined in such a way that an α parameter being a chirp parameter is a negative value.

2. The Mach-Zehnder type optical modulator according to claim 1, wherein the cross-port branching ratio n, the bar-port branching ratio 1-η, the cross-port branching ratio γ, and the bar-port branching ratio 1-γ are determined in such a way that the cross-port branching ratio η and the bar-port branching ratio 1-η do not have the same value or the cross-port branching ratio γ and the bar-port branching ratio 1-γ do not have the same value.

3. The Mach-Zehnder type optical modulator according to claim 2, wherein,
   when a phase difference between the light passing through the first arm and the light passing through the second arm is $\pi/2$, the phase modulation unit provides a positive-phase modulated signal to each of the first and second arms, and
   output light is output from an output of the second directional coupler serving as a cross port with respect to the input light.

4. The Mach-Zehnder type optical modulator according to claim 3, wherein the cross-port branching ratio η is larger than the cross-port branching ratio γ.

5. The Mach-Zehnder type optical modulator according to claim 4, wherein, when a transmission path of the output light is composed of a single-mode optical fiber, a transmission rate is 25 Gbps, γ=0.5, and an upper limit value of wavelength dispersion is an upper limit value 18.6 ps/nm/km of wavelength dispersion at a wavelength of 1550 nm of TTC standard JT-G652, a relationship between a transmission distance D [km] of the output light and an upper limit value $ER_{MAX}$ of an extinction ratio is expressed by Equation [1] below

[Mathematical 1]

$$D = 45.933 ER_{MAX}^{-0.382} \text{ [km]} \qquad [1].$$

6. The Mach-Zehnder type optical modulator according to claim 5, wherein the cross-port branching ratio η is set to 0.66 or more in such a way that an extinction ratio of the output light is equal to or less than an upper limit value 17.5 dB of the extinction ratio when a transmission distance of the output light is 15 km.

7. The Mach-Zehnder type optical modulator according to claim 5, wherein the cross-port branching ratio is set to 0.80 or less in such a way that an extinction ratio of the output light is equal to or higher than α lower limit value 7.5 dB of an extinction ratio for ensuring sensitivity of the output light on a reception side.

8. The Mach-Zehnder type optical modulator according to claim 2, wherein,
when a phase difference between the light passing through the first arm and the light passing through the second arm is $\pi/2$, the phase modulation unit provides a positive-phase modulated signal to each of the first and second arms, and
output light is output from an output of the second directional coupler serving as a bar port with respect to the input light.

9. The Mach-Zehnder type optical modulator according to claim 2, wherein,
when a phase difference between the light passing through the first arm and the light passing through the second arm is $-\pi/2$, the phase modulation unit provides a reversed-phase modulated signal to each of the first and second arms, and
output light is output from an output of the second directional coupler serving as a cross port with respect to the input light.

10. The Mach-Zehnder type optical modulator according to claim 9, wherein the cross-port branching ratio $\eta$ is set to 0.36 or less in such a way that an extinction ratio of the output light is equal to or less than an upper limit value 17.5 dB of the extinction ratio when a transmission distance of the output light is 15 km.

11. The Mach-Zehnder type optical modulator according to claim 9, wherein the cross-port branching ratio is set to 0.1 or more in such a way that an extinction ratio of the output light is equal to or higher than α lower limit value 7.5 dB of an extinction ratio for ensuring sensitivity of the output light on a reception side.

12. The Mach-Zehnder type optical modulator according to claim 2, wherein,
when a phase difference between the light passing through the first arm and the light passing through the second arm is $-\pi/2$, the phase modulation unit provides a reversed-phase modulated signal to each of the first and second arms, and
output light is output from an output of the second directional coupler serving as a bar port with respect to the input light.

13. An optical transceiver comprising:
a transmitter configured to transmit an optical signal having a light source and a Mach-Zehnder type optical modulator configured to modulate light from the light source;
a receiver configured to receive an optical signal to be input; and
a control unit configured to control the transmitter and the receiver, wherein
the Mach-Zehnder type optical modulator includes:
a first directional coupler configured to branch light being input from the light source into a cross-port path having a cross-port branching ratio $\eta$ and a bar-port path having a bar-port branching ratio $1-\eta$;
a first arm configured to propagate light from the cross-port path of the first directional coupler; a second arm configured to propagate light from the bar-port path of the first directional coupler;
a second directional coupler configured to have two inputs and two outputs, input light from the first arm to one input and light from the second arm to another input, and have a cross-port branching ratio of $\gamma$ and a bar-port branching ratio of $1-\gamma$; and
a phase modulation unit configured to provide a phase difference between the light propagating through the first arm and the light propagating through the second arm, wherein
the cross-port branching ratio $\eta$ and the bar-port branching ratio $1-\eta$, and the cross-port branching ratio $\gamma$ and the bar-port branching ratio $1-\gamma$ are determined in such a way that an α parameter being a chirp parameter is a negative value.

14. A dispersion compensation method comprising:
branching input light into a cross-port path having a cross-port branching ratio $\eta$ and a bar-port path having a bar-port branching ratio $1-\eta$ by a first directional coupler;
inputting light from the cross-port path of the first directional coupler to a first arm;
inputting light from the bar-port path of the first directional coupler to a second arm;
inputting light from the first arm to one input of a second directional coupler with two inputs and two outputs and inputting light from the second arm to another input, the second directional coupler having a cross-port branching ratio of $\gamma$ and a bar-port branching ratio of $1-\gamma$;
providing a phase difference between the light propagating through the first arm and the light propagating through the second arm; and
determining the cross-port branching ratio $\eta$ and the bar-port branching ratio $1-\eta$, and the cross-port branching ratio $\gamma$ and the bar-port branching ratio $1-\gamma$ in such a way that an α parameter being a chirp parameter is a negative value.

\* \* \* \* \*